(12) United States Patent
Kaneda et al.

(10) Patent No.: US 7,856,541 B2
(45) Date of Patent: Dec. 21, 2010

(54) LATENCY ALIGNED VOLUME PROVISIONING METHODS FOR INTERCONNECTED MULTIPLE STORAGE CONTROLLER CONFIGURATION

(75) Inventors: Yasunori Kaneda, San Jose, CA (US); Hiroshi Arakawa, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 907 days.

(21) Appl. No.: 11/737,117

(22) Filed: Apr. 18, 2007

(65) Prior Publication Data

US 2008/0263304 A1  Oct. 23, 2008

(51) Int. Cl.
*G06F 12/00* (2006.01)
(52) U.S. Cl. .............................. 711/170; 711/5; 711/100; 711/111; 711/112; 711/148; 711/149; 711/154; 711/167; 711/171; 711/172; 711/173

(58) Field of Classification Search .................... 711/5, 711/100, 111, 112, 148, 149, 154, 167, 170–173
See application file for complete search history.

(56) References Cited

U.S. PATENT DOCUMENTS 6,801,985 B1 * 10/2004 Comisky et al. ............ 711/149
6,854,034 B1 *  2/2005 Murakami et al. .......... 711/112
7,181,578 B1 *  2/2007 Guha et al. ................. 711/154

* cited by examiner

*Primary Examiner*—Tuan V Thai
*Assistant Examiner*—Zhuo H Li
(74) *Attorney, Agent, or Firm*—Sughrue Mion, PLLC

(57) ABSTRACT

A system is composed of multiple storage control modules, which are connected to each other via interconnects. The aforesaid interconnects connecting the storage control modules may cause certain extra latency. Each storage control module may have data preservation module, which can preserve data stored by host computers. The system incorporates a latency table and provides a volume according to the latency table in accordance with a request from a host computer or an administrator. The latency table is dynamically created or statically stored in the inventive system.

18 Claims, 35 Drawing Sheets

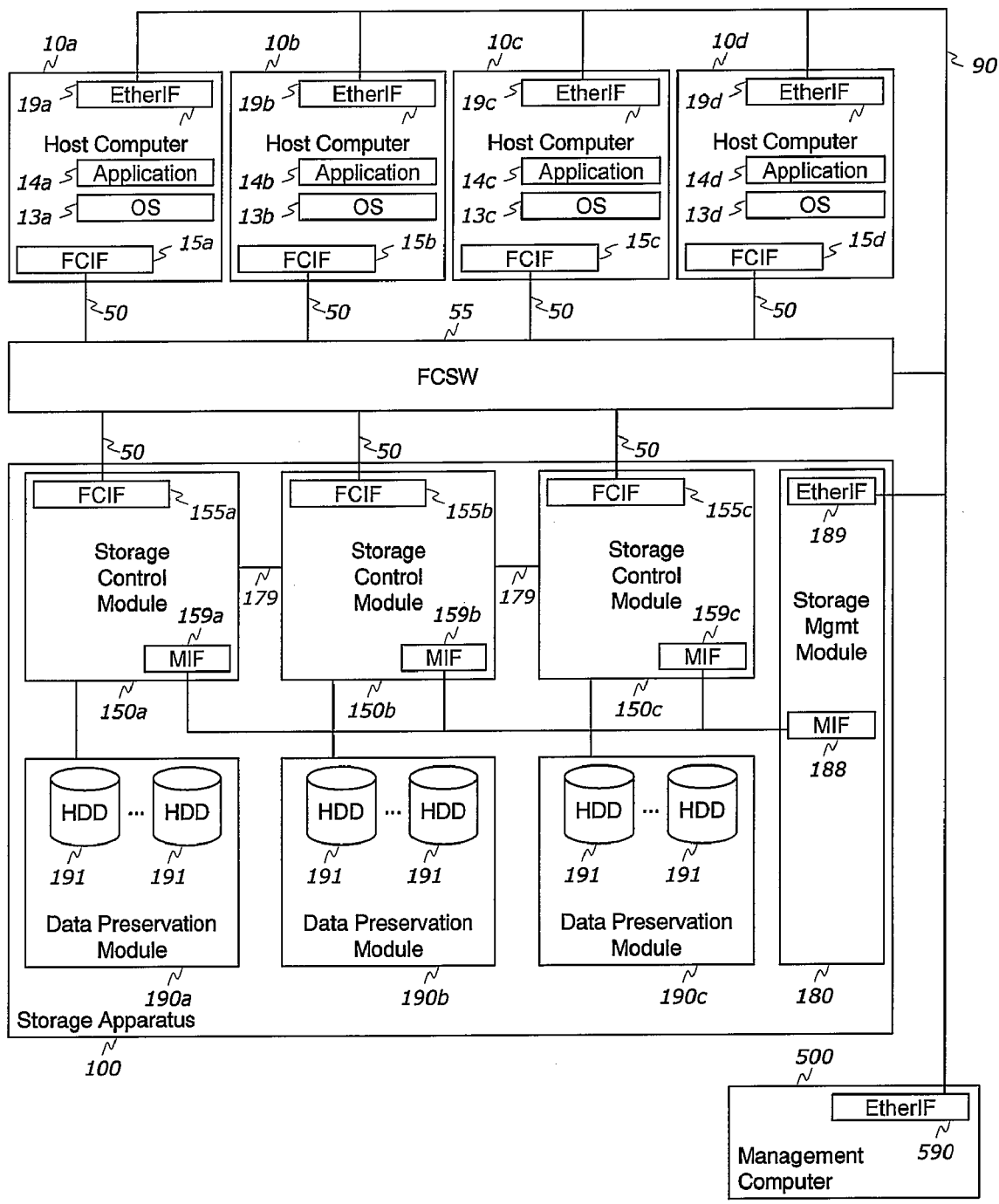

| WWN (Host Side) | SCM # | DPM # | CPU load | Allocated Cache Size | Volume # | Rule |
|---|---|---|---|---|---|---|
| 155a | 150a | 190a | | | | |
| 155b | 150b | 190b | | | | |
| 155c | 150c | 190c | | | | |

| DPM # | Volume Space Capacity | Volume # | Volume Capacity | Rule |
|---|---|---|---|---|
| 190a | 1000GB | | | |
| 190b | 1000GB | | | |
| 190c | 1000GB | | | |

Fig.3 (b)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
| 155b | 150b | 190b | | | | |
| 155c | 150c | 190c | | | | |

| DPM # | Volume Space Capacity | Volume # | Volume Capacity | Rule |
|---|---|---|---|---|
| 190a | 1000GB | 101 | 100GB | Gold |
| 190b | 1000GB | | | |
| 190c | 1000GB | | | |

SCM: Storage Control Module
DPM: Data Preservation Module

Fig.3 (c)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
| | | | | | | |
| 155b | 150b | 190b | 100% | 8GB | 102 | Gold |
| | | | | | | |
| 155c | 150c | 190c | | | | |
| | | | | | | |

| DPM # | Volume Space Capacity | Volume # | Volume Capacity | Rule |
|---|---|---|---|---|
| 190a | 1000GB | 101 | 100GB | Gold |
| | | | | |
| 190b | 1000GB | 102 | 100GB | Gold |
| | | | | |
| 190c | 1000GB | | | |
| | | | | |

Fig.3 (d)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
| | | | | | | |
| 155b | 150b | 190b | 100% | 8GB | 102 | Gold |
| | | | | | | |
| 155c | 150c | 190c | 25% | 3GB | 103 | Silver |
| | | | | | | |

| DPM # | Volume Space Capacity | Volume # | Volume Capacity | Rule |
|---|---|---|---|---|
| 190a | 1000GB | 101 | 100GB | Gold |
| | | | | |
| 190b | 1000GB | 102 | 100GB | Gold |
| | | | | |
| 190c | 1000GB | 103 | 500GB | Silver |
| | | | | |

SCM: Storage Control Module
DPM: Data Preservation Module

Fig.3 (e)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
|  |  |  |  |  |  |  |
| 155b | 150b | 190b | 100% | 8GB | 102 | Gold |
|  |  |  |  |  |  |  |
| 155c | 150c | 190c | 25% | 3GB | 103 | Silver |
|  |  |  |  | 1GB | 104 | Bronze |

| DPM # | Volume Space Capacity | Volume # | Volume Capacity | Rule |
|---|---|---|---|---|
| 190a | 1000GB | 101 | 100GB | Gold |
|  |  | 104 | 800GB | Bronze |
| 190b | 1000GB | 102 | 100GB | Gold |
|  |  |  |  |  |
| 190c | 1000GB | 103 | 500GB | Silver |
|  |  |  |  |  |

Fig.3 (f)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
|  |  |  |  |  |  |  |
| 155b | 150b | 190b | 100% | 8GB | 102 | Silver |
|  |  |  |  |  |  |  |
| 155c | 150c | 190c | 25% | 3GB | 103 | Silver |
|  |  |  |  | 1GB | 104 | Bronze |

| DPM # | Volume Space Capacity | Volume # | Volume Capacity | Rule |
|---|---|---|---|---|
| 190a | 1000GB | 101 | 100GB | Gold |
|  |  | 104 | 800GB | Bronze |
| 190b | 1000GB | 102 | 100GB | Silver |
|  |  |  |  |  |
| 190c | 1000GB | 103 | 500GB | Silver |
|  |  |  |  |  |

SCM: Storage Control Module
DPM: Data Preservation Module

Fig.3 (g)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
|  |  |  |  |  |  |  |
|  |  |  |  |  |  |  |
| 155b | 150b | 190b | 100% | 8GB | 102 | Silver |
|  |  |  |  |  |  |  |
|  |  |  |  |  |  |  |
|  |  |  |  | 3GB | 103 | Silver |
| 155c | 150c | 190c | 25% | 1GB | 104 | Bronze |
|  |  |  |  |  |  |  |

| DPM # | Volume Space Capacity | Volume # | Volume Capacity | Rule |
|---|---|---|---|---|
|  |  | 101 | 100GB | Gold |
| 190a | 1000GB | 104 | 800GB | Bronze |
|  |  |  |  |  |
| 190b | 1000GB |  |  |  |
|  |  |  |  |  |
|  |  | 103 | 500GB | Silver |
| 190c | 1000GB | 102 | 100GB | Silver |
|  |  |  |  |  |

Fig.3 (h)

| WWN (Host Side) | SCM # | DPM # | CPU load | Allocated Cache Size | Volume # | Rule |
|---|---|---|---|---|---|---|
| 155a | 150a | 190a | 100% | 8GB | 101 | Gold |
|  |  |  |  |  |  |  |
|  |  |  |  |  |  |  |
| 155b | 150b | 190b | 100% |  |  |  |
|  |  |  |  |  |  |  |
|  |  |  |  |  |  |  |
|  |  |  |  | 3GB | 103 | Silver |
| 155c | 150c | 190c | 25% | 1GB | 104 | Bronze |
|  |  |  |  | 3GB | 102 | Silver |

| DPM # | Volume Space Capacity | Volume # | Volume Capacity | Rule |
|---|---|---|---|---|
|  |  | 101 | 100GB | Gold |
| 190a | 1000GB | 104 | 800GB | Bronze |
|  |  |  |  |  |
|  |  | 102 | 100GB | Silver |
| 190b | 1000GB |  |  |  |
|  |  |  |  |  |
|  |  | 103 | 500GB | Silver |
| 190c | 1000GB |  |  |  |
|  |  |  |  |  |

SCM: Storage Control Module
DPM: Data Preservation Module

Fig.4 (a)

| Storage Control Module # \ Data Preservation Module # | 190a | 190b | 190c |
|---|---|---|---|
| 150a | 10us | 110us | 210us |

Fig.4 (b)

| Storage Control Module # \ Data Preservation Module # | 190a | 190b | 190c |
|---|---|---|---|
| 150b | 110us | 10us | 110us |

Fig.4 (c)

| Storage Control Module # \ Data Preservation Module # | 190a | 190b | 190c |
|---|---|---|---|
| 150c | 210us | 110us | 10us |

| Storage Control Module # \ Data Preservation Module # | 190a | 190b | 190c |
|---|---|---|---|
| 150a | 0us | 100us | 200us |
| 150b | 100us | 0us | 100us |
| 150c | 200us | 100us | 0us |

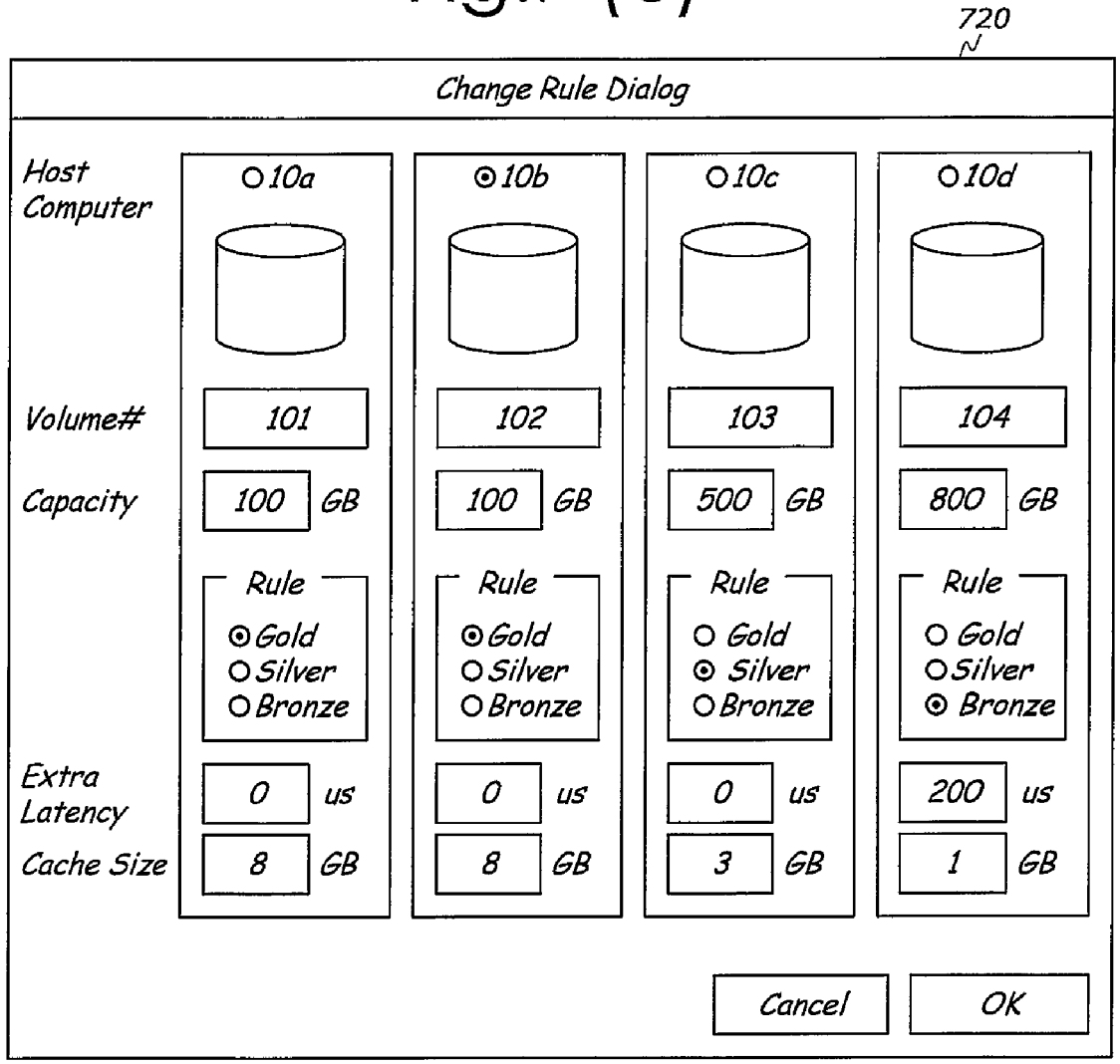

Fig.11 (a)

| Zone # | WWN in Zone |
|---|---|
| 1 | 15a, 155a |
| : | : |

Fig.11 (b)

| Zone # | WWN in Zone |
|---|---|
| 1 | 15a, 155a |
| 2 | 15b, 155b |
| : | : |

Fig.11 (c)

| Zone # | WWN in Zone |
|---|---|
| 1 | 15a, 155a |
| 2 | 15b, 155b |
| 3 | 15c, 155c |
| : | : |

Fig.11 (d)

| Zone # | WWN in Zone |
|---|---|
| 1 | 15a, 155a |
| 2 | 15b, 155b |
| 3 | 15c, 155c |
| 4 | 15d, 155c |
| ⋮ | ⋮ |

Fig.11 (e)

| Zone # | WWN in Zone |
|---|---|
| 1 | 15a, 155a |
| 2 | 15b, 155c |
| 3 | 15c, 155c |
| 4 | 15d, 155c |
| ⋮ | ⋮ |

Fig.12 (a)

| Storage Control Module # | Volume # | Access Permitted WWN |
|---|---|---|
| 150a | 101 | 15a |
| | : | : |

Fig.12 (b)

| Storage Control Module # | Volume # | Access Permitted WWN |
|---|---|---|
| 150b | 102 | 15b |
| | : | : |

Fig.12 (c)

| Storage Control Module # | Volume # | Access Permitted WWN |
|---|---|---|
| 150c | 103 | 15c |
| | : | : |

Fig.12 (d)

| Storage Control Module # | Volume # | Access Permitted WWN |
|---|---|---|
| 150c | 103 | 15c |
| | 104 | 15d |
| | : | : |

Fig.12 (e)

| Storage Control Module # | Volume # | Access Permitted WWN |
|---|---|---|
| 150b | | |
| | : | : |

Fig.12 (f)

| Storage Control Module # | Volume # | Access Permitted WWN |
|---|---|---|
| 150c | 103 | 15c |
| | 104 | 15d |
| | 102 | 15b |
| | : | : |

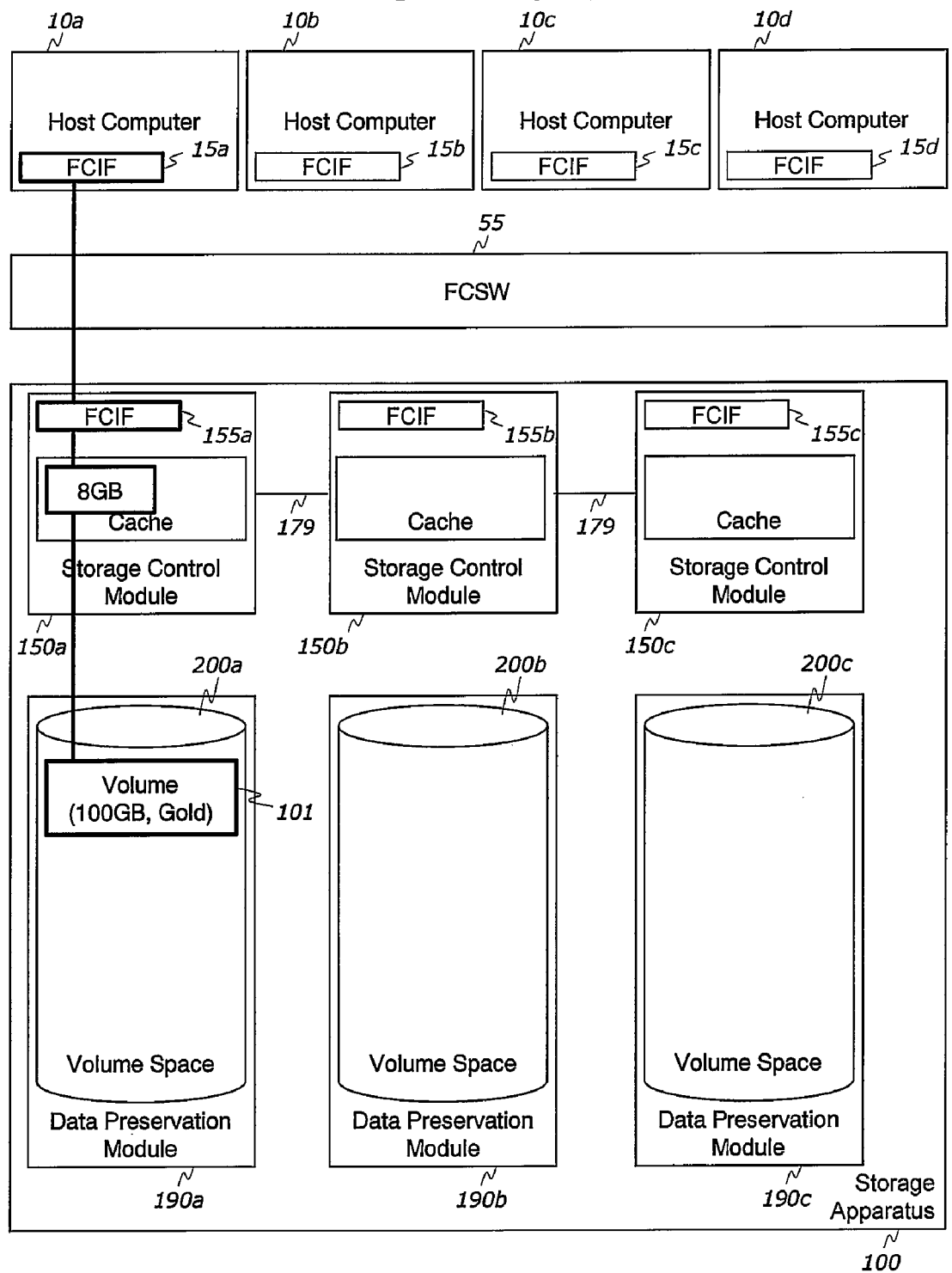

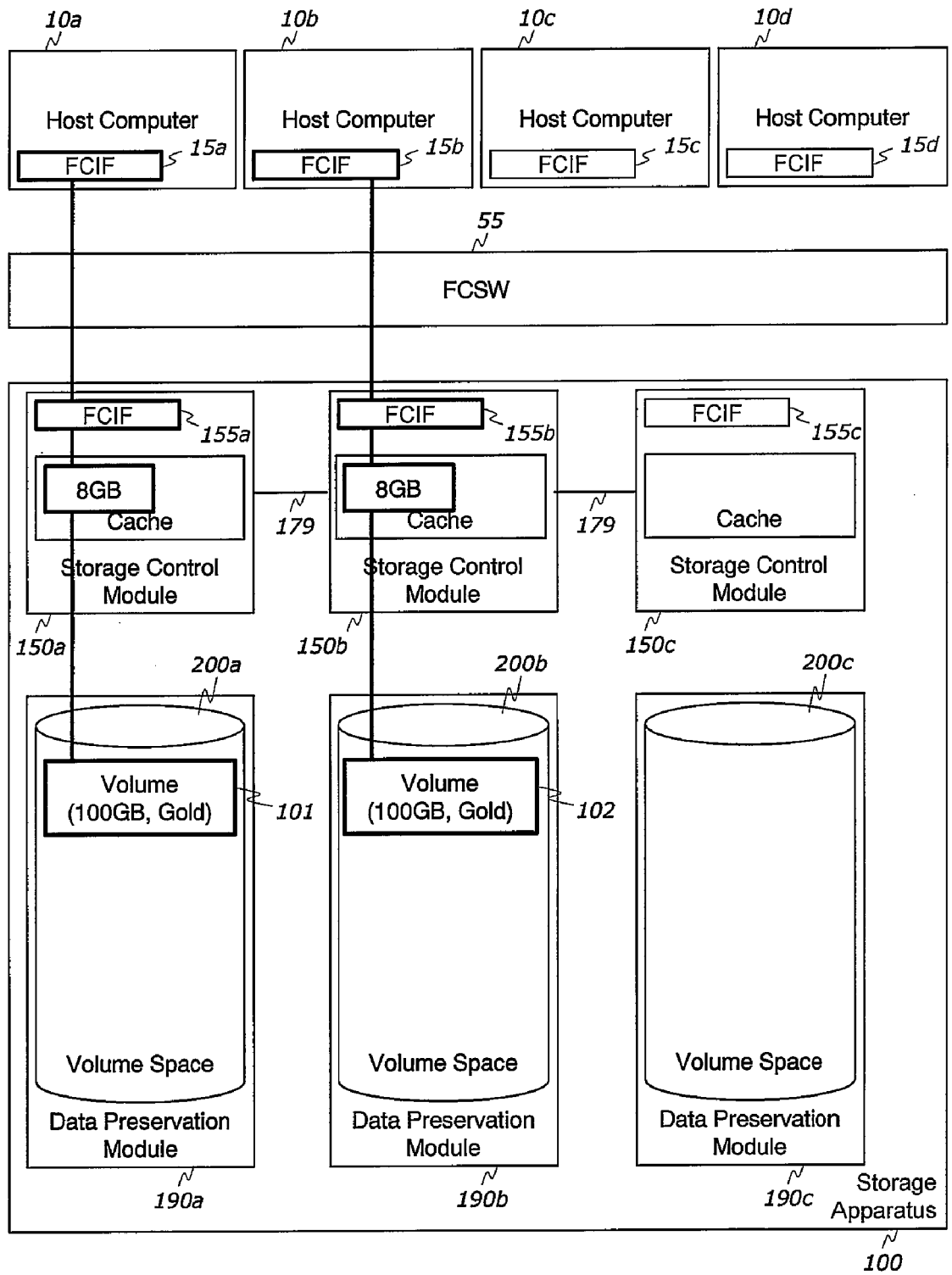

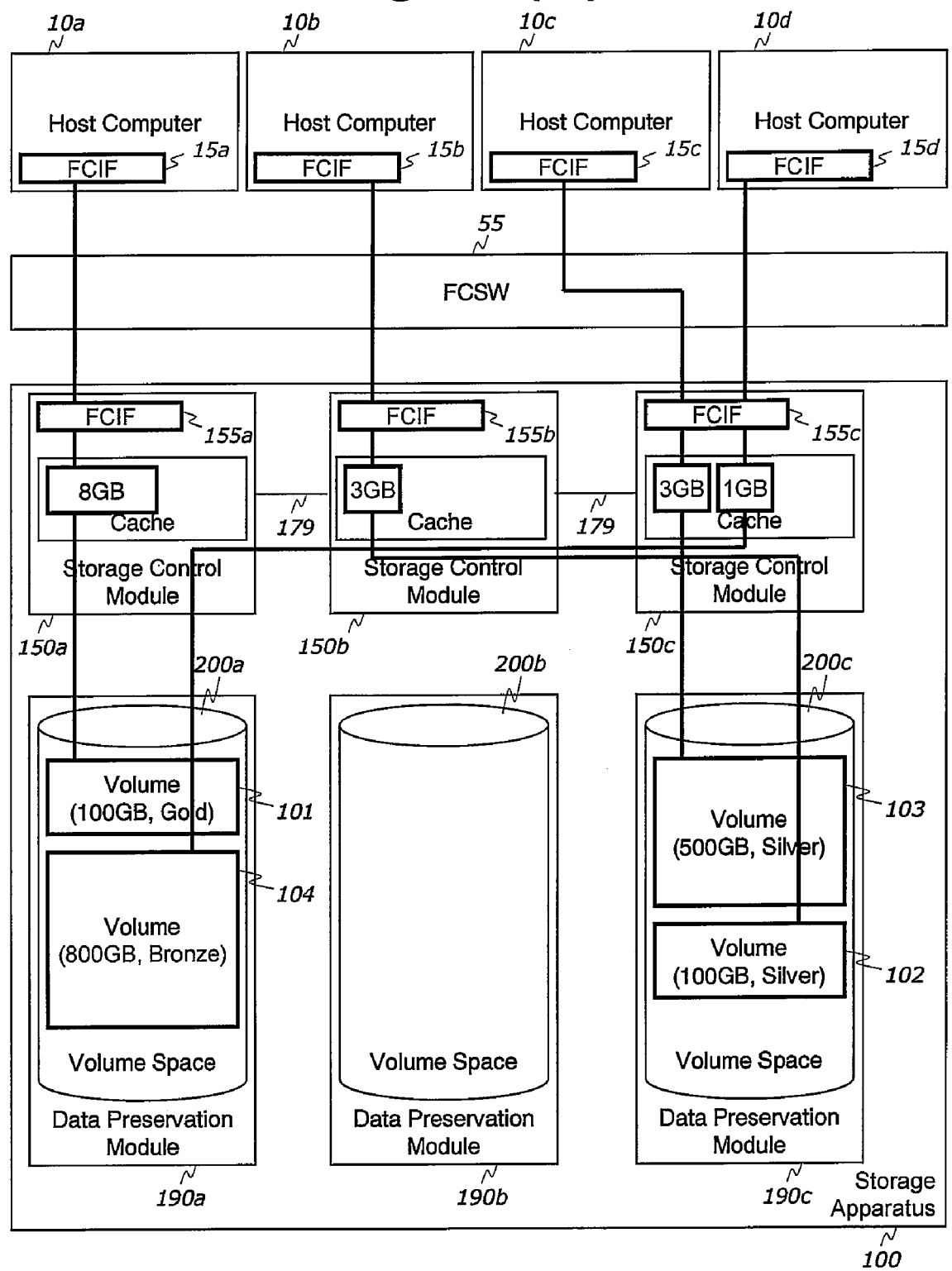

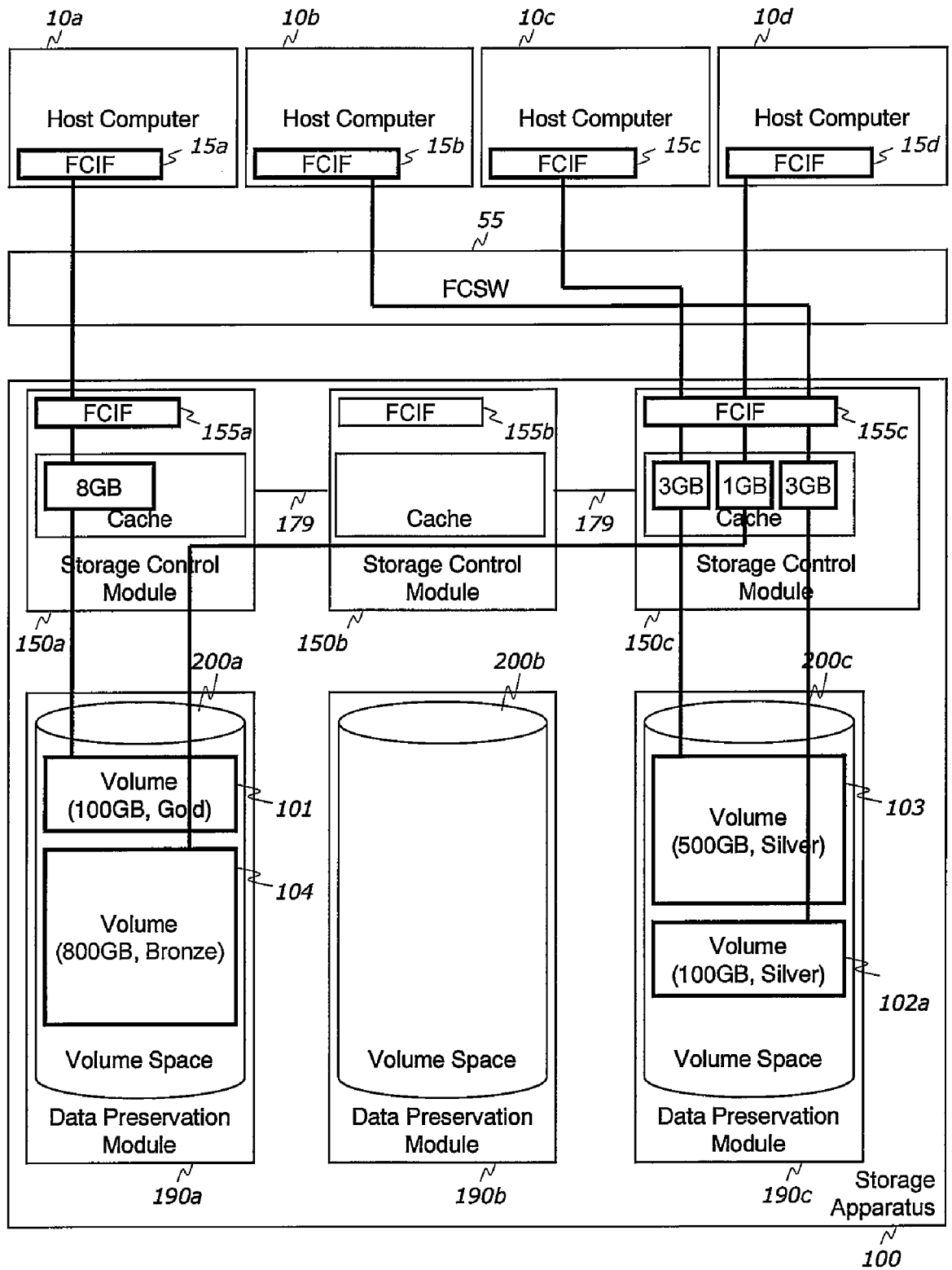

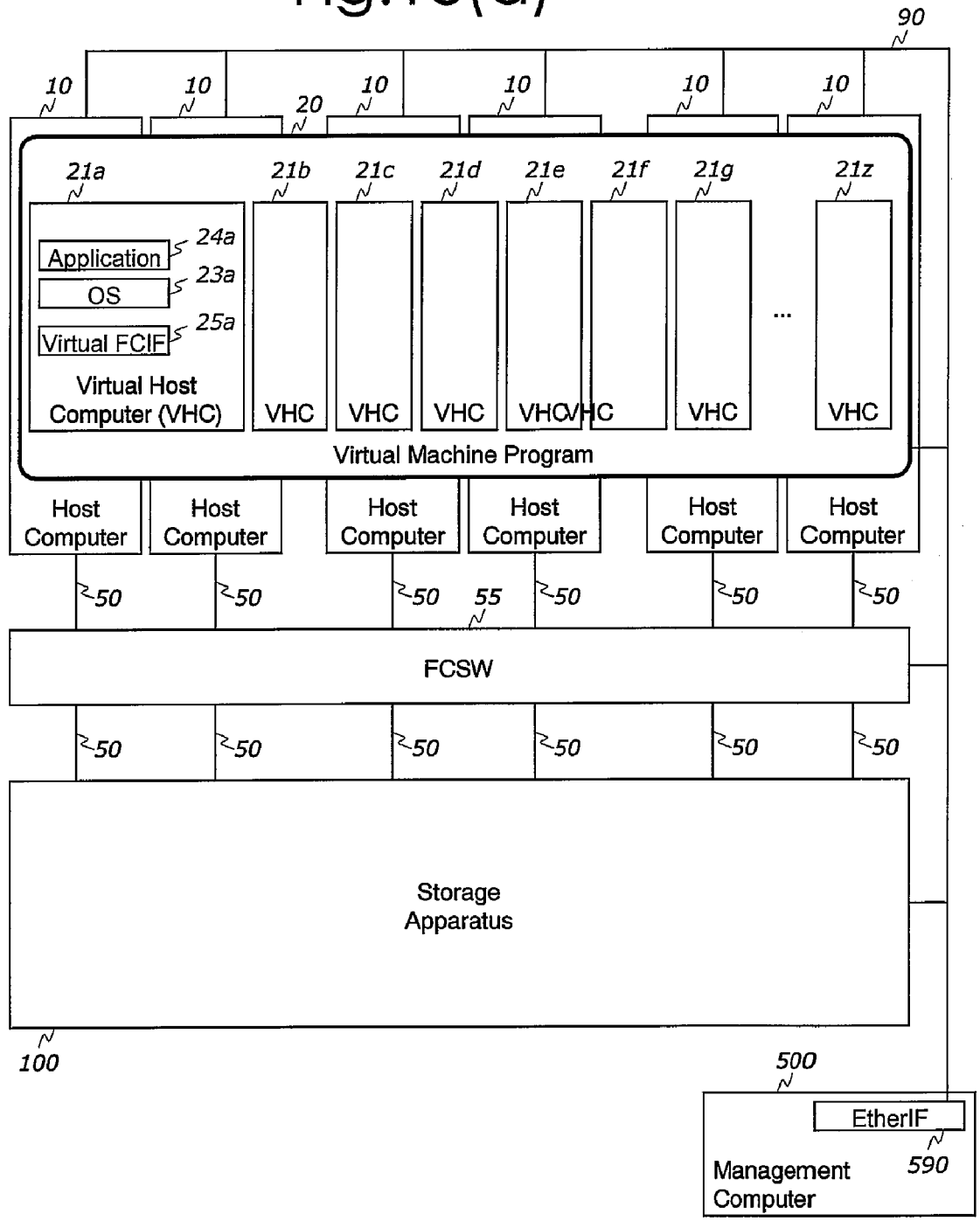

LATENCY ALIGNED VOLUME PROVISIONING METHODS FOR INTERCONNECTED MULTIPLE STORAGE CONTROLLER CONFIGURATION

FIELD OF THE INVENTION

This invention generally relates to storage resource management and more specifically to techniques for providing storage resources to a host computer according to a request with performance objective.

DESCRIPTION OF THE RELATED ART

Consolidation is one of the solutions for reducing storage management cost. To consolidate multiple storage volumes in one storage system, the storage system must be capable of handling and allocating large number of different storage volumes with different performance characteristics. Such storage systems must have multiple ports for connecting to client hosts. If there are no performance differences among these ports, any port can be selected for connecting to the host computer. However, if there are performance differences among the ports due to, for example, internal hardware architecture of the storage system, a port having appropriate performance characteristics must be selected for connecting to the host computer to ensure the appropriate performance level. However, the implementation of such selection process is difficult.

U.S. Pat. No. 6,854,034, entitled "Computer system and a method of assigning a storage device to a computer," incorporated herein by reference, discloses a process for allocating volumes to a host computer. In the system described in this reference, configuration changes for host computers, network switches and storage apparatus are made when the aforesaid volume is allocated to the host computer. However, this reference fails to address selecting the appropriate port from the performance point of view in a storage system which is composed of multiple storage control modules, each having an individual cache and being connected to other storage control modules via interconnect(s).

Thus, the existing technology fails to provide methodology for allocating appropriate storage system volumes to client host computers without any internal storage architecture knowledge, in storage systems composed of multiple storage control modules, each having an individual cache and being connected to other storage control modules via interconnect(s).

SUMMARY OF THE INVENTION

The inventive methodology is directed to methods and systems that substantially obviate one or more of the above and other problems associated with conventional techniques for storage resource management.

A system in accordance with one aspect of the invention is composed of multiple storage control modules, which are connected to each other via interconnects. The aforesaid interconnects connecting the storage control modules may cause certain extra latency. Each storage control module may have data preservation module, which can preserve data stored by host computers. The inventive system incorporates a latency table and provides a volume according to the latency table in accordance with a request from a host computer or an administrator. The latency table is dynamically created or statically stored in the inventive system.

In accordance with an aspect of the inventive technique, there is provided a computerized data storage system, an associated method and an associated computer readable medium embodying a computer programming product implementing said method. The inventive system includes a plurality of storage control modules, each comprising a cache; a plurality of data preservation modules an interconnect interconnecting the plurality of storage control modules; and a storage management module. The data preservation modules store data associated with at least one host computer. Each data preservation module is associated with one of the plurality of storage control modules. The storage management module receives a request from a client host computer or an administrator and provides to the client host computer, in response to the received request, a storage volume allocated in one of the data preservation modules and at least a portion of the cache of one of storage control modules. The storage volume and the portion of the cache are provided based on latency information associated with the storage control modules.

In accordance with another aspect of the inventive technique, there is provided a computerized data storage system, an associated method and an associated computer readable medium embodying a computer programming product implementing said method. The inventive system includes a plurality of storage control modules; a plurality of data preservation modules each including a RAID control module and a cache. The data preservation modules store data associated with at least one host computer. Each of the plurality of data preservation modules is associated with one storage control module. The inventive system further includes an interconnect interconnecting the plurality of storage control modules and a storage management module which receives a request from a client host computer or an administrator and provides to the client host computer, in response to the received request, a storage volume allocated in one of the plurality of data preservation modules and at least a portion of the cache of one of the plurality of data preservation modules. The storage volume and the portion of the cache are provided based on latency information associated with the storage control modules.

In accordance with further aspect of the inventive technique, there is provided a method and an associated computer readable medium embodying a computer programming product implementing said method. The inventive method is executed by a computerized data storage system including a plurality of storage control modules, each having a cache, and a plurality of data preservation modules storing data associated with at least one host computer. Each of the plurality of data preservation modules is associated with one of the plurality of storage control modules. The inventive method involves receiving a request from a client host computer or an administrator; and providing to the client host computer, in response to the received request, a storage volume allocated in one of the plurality of data preservation modules and at least a portion of the cache of one of the plurality of storage control modules. The storage volume and the portion of the cache are provided based on latency information associated with the storage control modules.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3(a)-(h) illustrate exemplary configuration table.

FIG. 4(a)-(c) illustrates latency measurement information reported to storage control module management program.

FIG. 5 illustrates an exemplary embodiment of a latency table.

FIG. 11 (a)-(e) illustrate exemplary embodiments of an updated zone management table.

FIG. 12(a)-(f) illustrate exemplary embodiments of an updated LUN security table.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

First Embodiment

Figure 1:
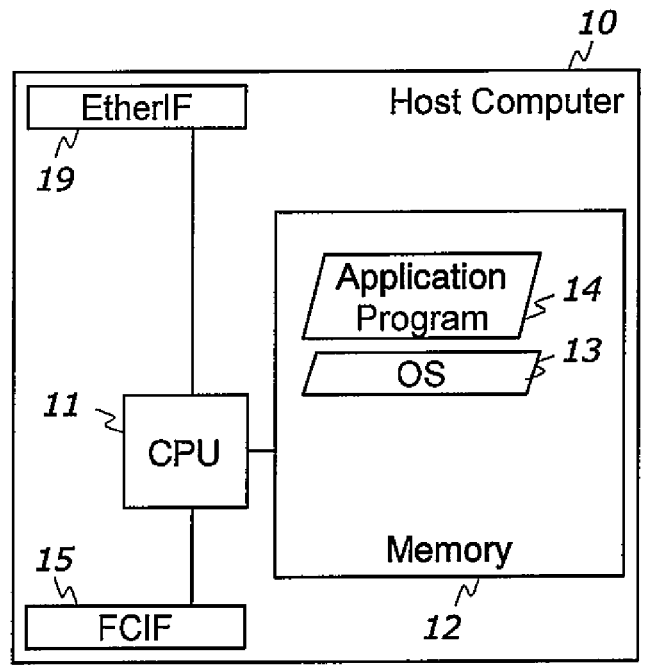
FIG. 1 shows an exemplary embodiment of the information system in which the method of this invention is applied.
Figure 1:
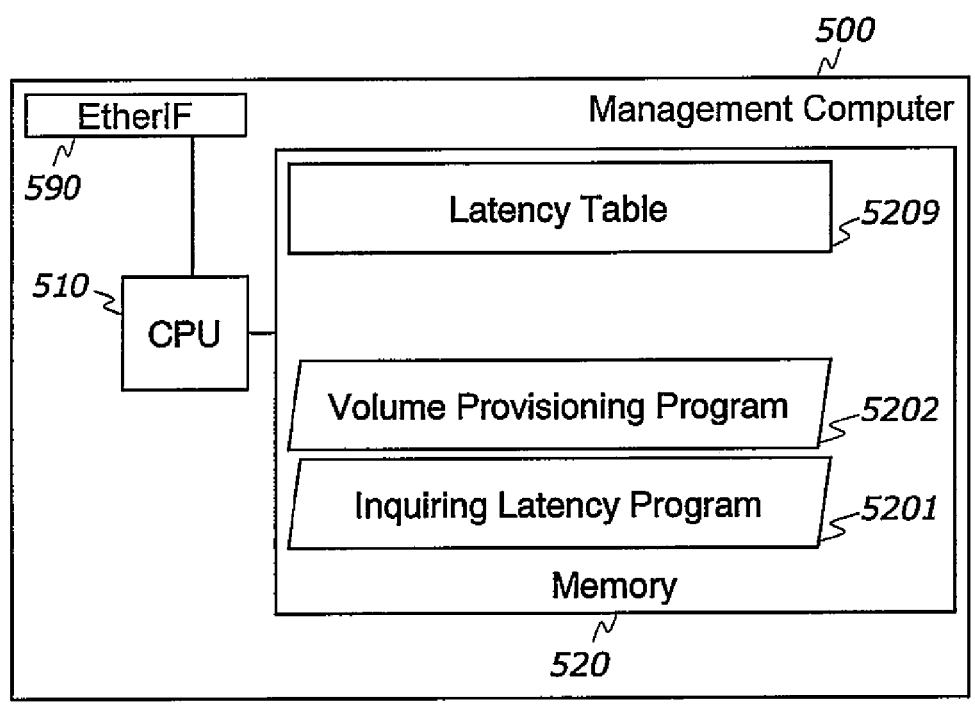
Figure 1:
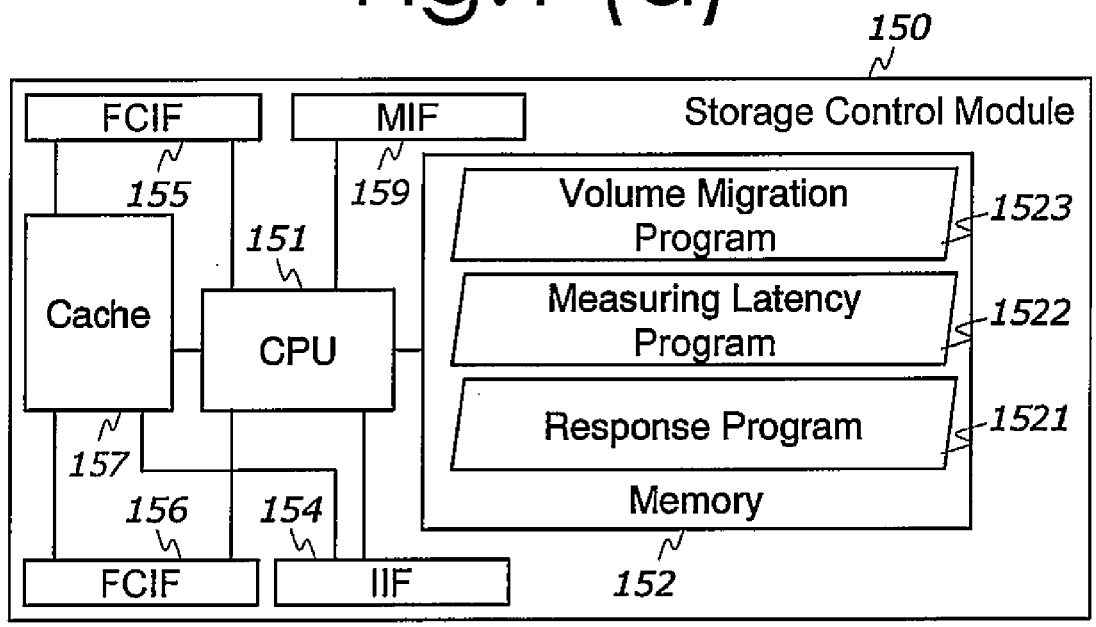
Figure 1:
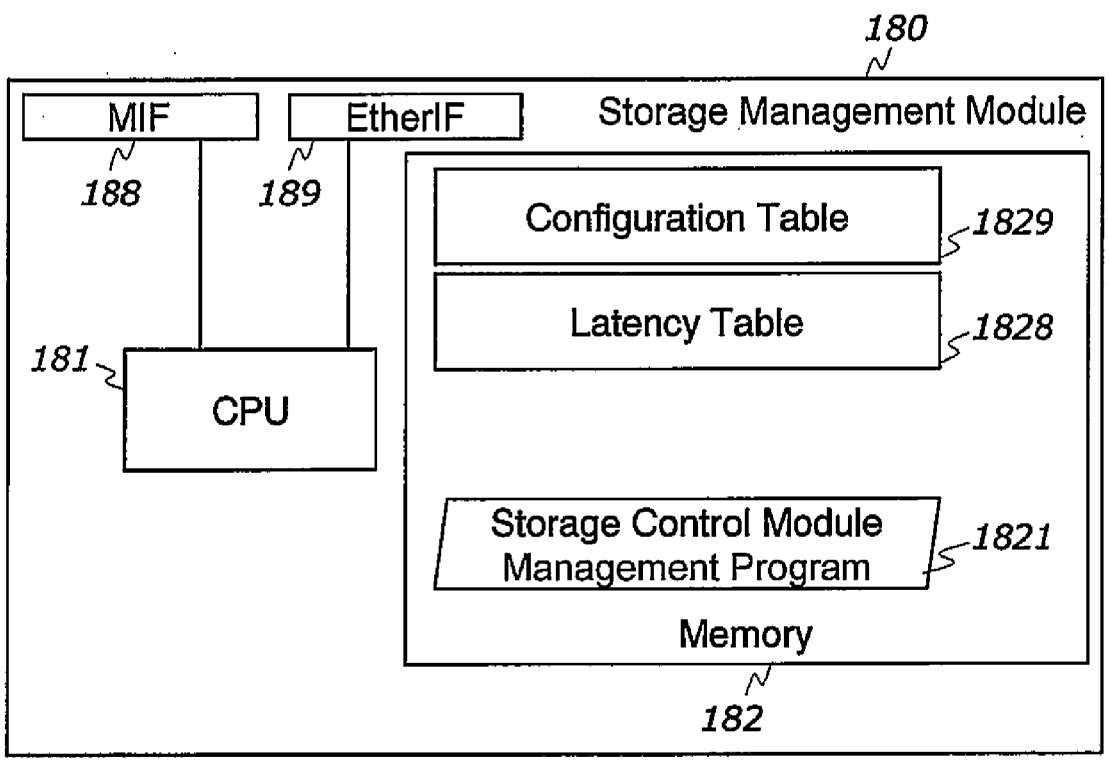
Figure 1:
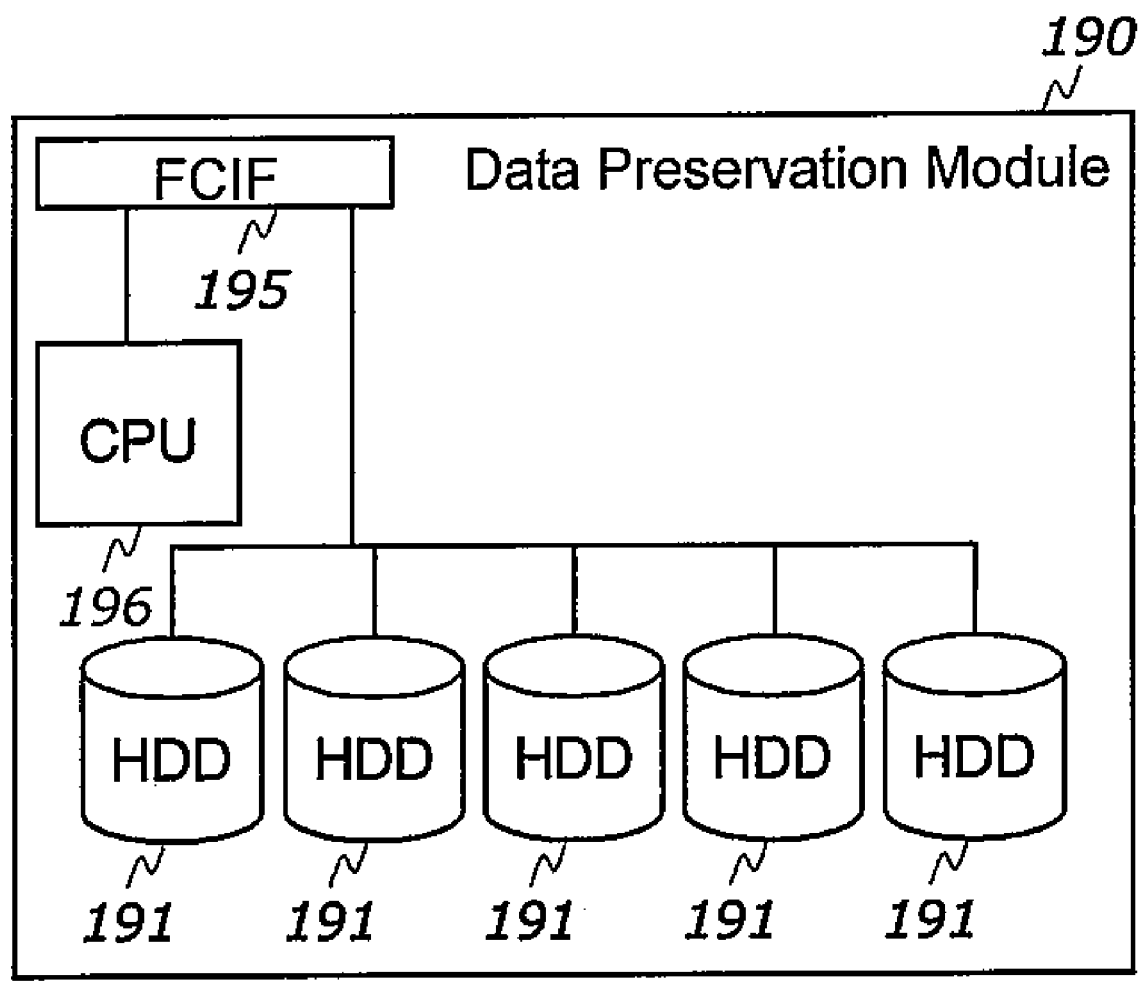

System Configuration:

FIG. 1 shows an example of the information system overview in which the method of this invention applied. The information system for the $1^{st}$ embodiment composed of:

Host Computer 10:

At least one host computer 10 is connected to the storage apparatus 100 via data network 50. In this embodiment, four host computers 10a, 10b, 10c, 10d are connected. At least one OS 13 is executed on the host computer. An application 14 may be executed on the OS 13. Files and data for the OS 13 and the application 14 are stored in volumes, which are provided by storage apparatus. The OS 13 and the application 14 issue write and read command to the storage apparatus.

Management Computer 500:

At least one management computer 500 is connected to the host computer 10, Fibre Channel switch 55 (referred as FCSW 55) and the storage apparatus 100 via management network 90.

Storage Apparatus 100:

At least one storage apparatus 100, which is composed of plural storage control modules 150, storage management module 180 and plural data preservation modules 190. The data preservation module 190 has plural HDDs 191 and connected to the storage control module 150. Storage control module 150 manages data stored by the host computers. Storage control 150 may apply an array algorism for protecting preserved data in the data preservation module 190. In this embodiment, the storage apparatus 100 has three storage control modules 150. The storage control module 150 are connected each other via interconnect 179. So the storage control module 150 can issue read/write request to data preservation module, which is connected to another storage control module via the interconnect 179. For example, the storage control module 150a can issue read/write request to the data preservation module 190c via the interconnect 179 even though the preservation modules 190c have no direct connection to the storage control module 150a.

Data Network 50:

Host computer 10 and storage apparatus 100 are connected via data network 50. The data network 50 in this embodiment is Fibre Channel. However other network, such as Ethernet and Infiniband can be used. Network switches and hubs can be used for connecting each other. In the FIG. 1, FCSW 55 is used for connecting each other. The host computer 10 and storage apparatus 100 have one or more Fibre Channel interface board (referred as FCIF) for connecting to the Fibre Channel data network 50.

Management Network 90:

The host computer 10, FCSW 55 and storage apparatus 100 are connected to the management computer 500 via management network 90. The management network 90 in this embodiment is Ethernet. However other network and data transfer means (ex. RS232C) can be used. Network switches and hubs can be used for connecting each other. The host computer 10, FCSW 55, the management computer 500 and the storage apparatus 100 have one or more Ethernet interface board (referred as EtherIF) for connecting to the Ethernet management network 90.

Host Computer 10 Details:
  Host computer 10 is composed of:
  CPU 11 for executing programs stored in memory 12.
  Memory 12 for storing the programs and data.
  FCIF 15 for connecting to the data network 50.
  EtherIF 19 for connecting to the management network 90.
  At least two programs executed by CPU11.
  In this embodiment memory 12 stores:
  Operating system program 13 (referred as OS 13).
  Application program 14.

Management Computer 500 Details:
  Management computer 500 is composed of:
  CPU 510 for executing programs stored in memory 520.
  Memory 520 for storing the programs and data.
  EtherIF 590 for connecting to the management network 90.
  At least two programs executed by CPU510.
  In this embodiment memory 520 stores:
  Inquiring latency program 5201 for inquiring the latency to the storage control module 150.
  Volume provisioning program 5202 for providing a volume to the host computer 10.
  Latency table 5209 for keeping latency information gathered by the inquiry latency program 5201.

Storage Apparatus 100:
  Storage apparatus 100 is composed of:
  Plural storage control modules 150.
  Interconnection 179 for connecting among storage control modules 150.
  Storage management module 180 for managing and monitoring the storage control modules 150.
  Plural data preservation modules 190 for preserving data written by the host computer 10.
  Storage control module 150 is composed of:
  CPU 151 for executing programs stored in memory 152.
  Memory 152 for storing programs and data.
  Interconnect interface 154 (referred as IIF 154) for connecting among the storage controllers and exchanging requests and transferring migration data.
  FCIF 155 for connecting to the host computer 10 via data network 50.
  FCIF 156 for connecting to the data preservation module 190. (If the data preservation module 190 has another interface, such as SATA (Serial Advanced Technology Attachment), SCSI (Small Computer System Ingerface), SAS (Serial Attached SCSI), appropriate interface should be used.)
  Cache 157 for keeping data temporally for accelerating request responses from the host computer 10. In this embodiment, cache size is assumed as 10 GB.
  Management interface 159 (referred as MIF 159) for connecting to the storage management module 180.
  At least three programs executed by CPU 151.
  In this embodiment, memory 152 stores:
  Response program 1521 for responding to requests, such as READ, WRITE and so on, from the host computer 10.
  Measuring latency program 1522 for measuring the latency among the storage control module 150 and the data preservation modules 190.
  Volume migration program 1523 for migrating data from one volume space to another one. The data migration program 1523 can work with another volume migration program 1523 on another storage control module 150 for migrating between two data preservation modules. The interconnect 179 is used for transferring data among data preservation modules. Storage apparatus 100 may have two interconnections; one is for only exchanging requests, the other is for only transferring migration data.

Storage control module 180 is composed of:
  CPU 181 for executing programs stored in memory 182.
  Memory 182 for storing programs and data.
  MIF 188 for connecting to the storage controller modules 150.
  EtherIF 189 for connecting to the management network 90.
  At least one program executed by CPU 181.
  In this embodiment, memory 182 stores:
  Storage control module management program 1821 for monitoring and controlling the storage control module 150.
  Configuration table 1829 for keeping relations among the storage control modules 150 and the data preservation modules 190.
  Latency table 1828 for keeping latency information.
  Data preservation module 190 is composed of:
  One or more HDDs 191.
  CPU 196 for responding measuring packets.
  FCIF195 for connecting to the storage control module 150.

Figure 2:
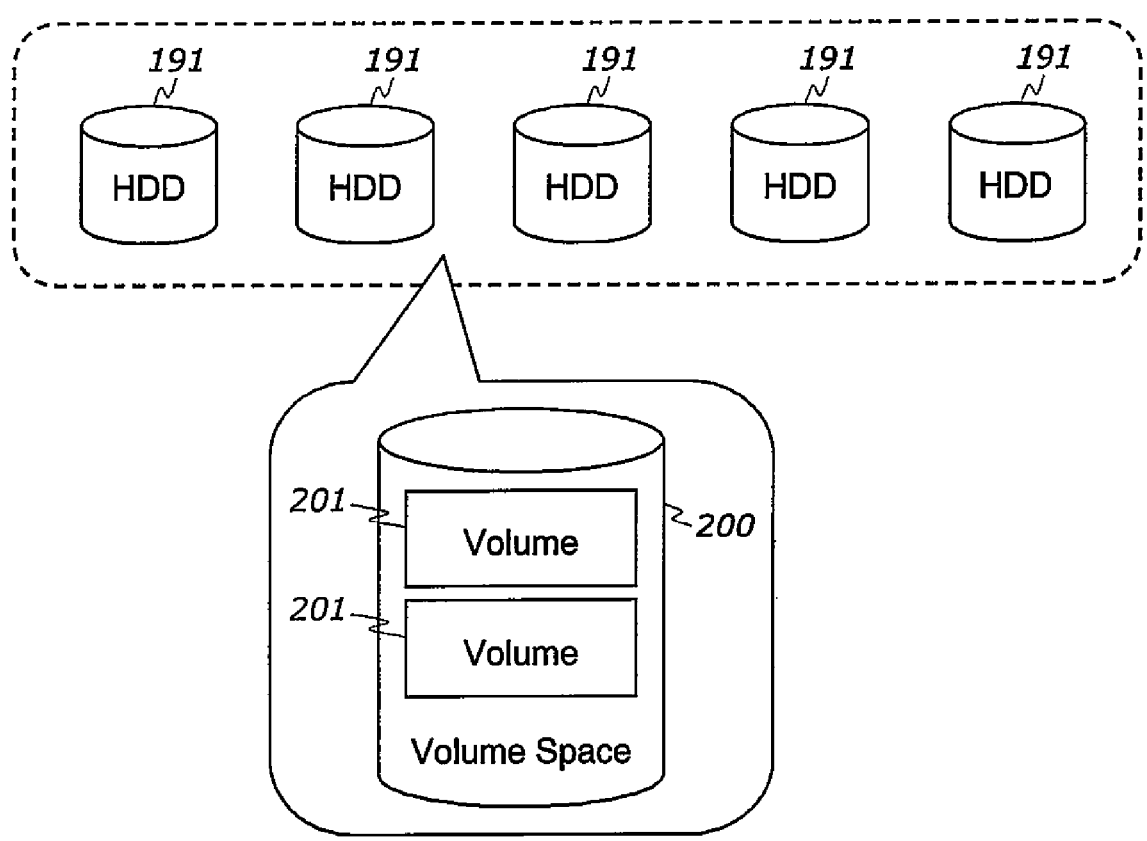
FIG. 2 shows relationship between HDDs, volume space and volumes.

Volume:
  FIG. 2 shows relationship between HDDs 191, volume space 200 and volumes. The volume space 200 is composed of the plural HDDs 191. In this embodiment, the five HDDs 191 present one volume space 200 for volumes by applying RAID5 technology. In the FIG. 2, the volume 201 and 202 are allocated in the volume space 200 by the storage control module management program 1821. In this case volume 201 and 202 share performance because volume 201 and 202 share the HDD 191s physically.

Configuration Table:
  FIG. 3(a) shows the configuration table 1829. The configuration table 1829 is composed of two parts. For example, the storage control module 150a has one FCIF, which WWN is 155a (Actual WWN has 64 bit length. However it is complicated to use in the embodiment. So, WWNs in this embodiment are shortened and numbers in the figure are used as WWN instead.), 10 GB cache, one data preservation module 190a, which capacity is 1000 GB and no volume now. The storage control module 150c has one FCIF, which WWN is 155c, 10 GB cache, one data preservation module 190c, which capacity is 1000 GB and no volume now. CPU load is stored real-time. Volume number, volume capacity, allocated cache size and rule are stored when a volume is allocated.

Creating Latency Table:
  When the storage apparatus 100 is powered on, the storage control module management program 1821 invokes a latency measurement request to the measuring latency program 1522 in the storage control module 150. Each measuring latency program 1522 starts to measure. In the case of the storage control module 150a, the measuring program 1522 in the storage control module 150a invokes measuring packets to the data preservation module 190a, 190b and 190c in order. In this embodiment, the measuring packets are responded by the CPU 196. The measuring latency program 1522 measures a time between issuing and receiving. The measuring packet to the data preservation module 190a is invoked directly. However the measuring packets to the data preservation module 190b and 190c are invoked via interconnect 179. So the latency to the data preservation module 190b and 190c are longer than to the data preservation module 190a in this embodiment. The measuring latency program 1522 reports the latency to the storage control module management program 1821. Specifically, information shown in FIG. 4(a) is reported. The latency measuring program in the storage control module 150b and 150c also measure the latency and report to the storage control module management program 1821. Information in FIG. 4(b) and (c) are reported. The storage control module management program 1821 creates the latency table 1828 shown in FIG. 5. As shown in FIG. 5, the latencies are adjusted by minimum latency 10 us. So the latency table 1828 is normalized and shows extra latency compared with direct access. In this embodiment, the measuring latency program 1522 is used for creating the latency table 1828. However latencies are clearly known according to hardware architecture statically, static latency table can be used instead.

The inquiring latency program 5201 in the management computer 500 inquires the latency table to the storage control module management program 1821 when the management computer 500 is started. The storage control module management program 1821 reports the latency table 1828. The latency table is stored as the latency table 5209 in the memory 520. The management computer 500 may inquire the latency table from the storage apparatus 100 periodically.

Rules (Gold, Silver and Bronze):

In this embodiment, three rules, gold, silver and bronze, for allocating volume are presented. An administrator indicates volume allocation with a rule from the predefined rules.

Gold:
Rule for allocating volume with minimum latency.
8 GB cache must be allocated exclusively.
Storage control module can be shared with another volume with bronze rule.
Data preservation module can be shared with another volume with bronze rule.

Silver:
Rule for allocating volume with latency less than 150 us.
3 GB cache must be allocated exclusively.
Storage control module can be shared with another volume with bronze or silver rule.
Data preservation module can be shared with another volume with bronze or silver rule.

Bronze:
Rule for allocating volume without latency limitation.
1 GB cache is allocated exclusively.
Storage control module can be shared with another volume with bronze or silver rule.
Storage control module can be shared with another volume with gold rule in the case of the CPU load is less than 80%.
Data preservation module can be shared with another volume with any rule.

Figure 6:
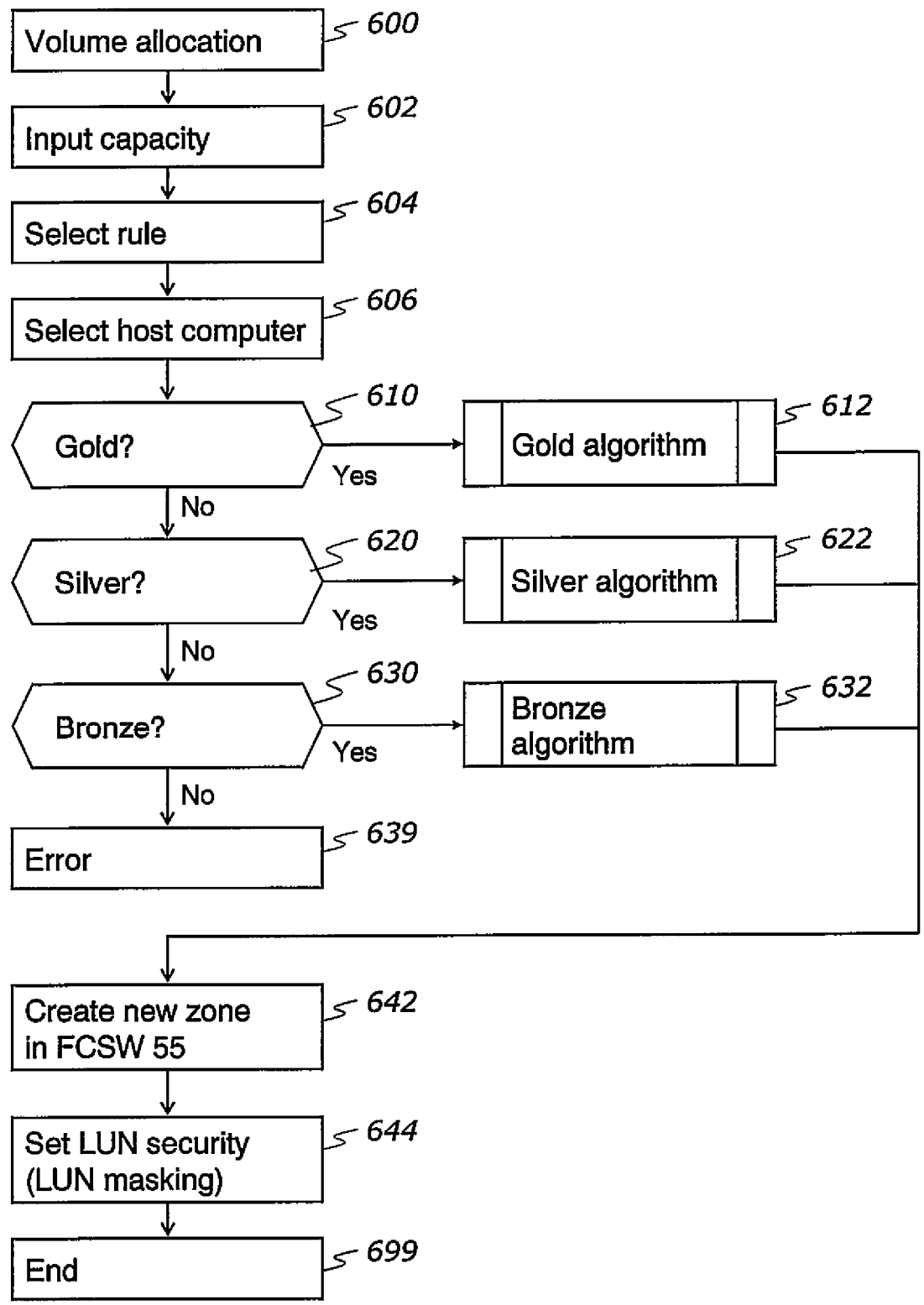
FIG. 6 illustrates process flow for allocating a volume.
Figure 7:
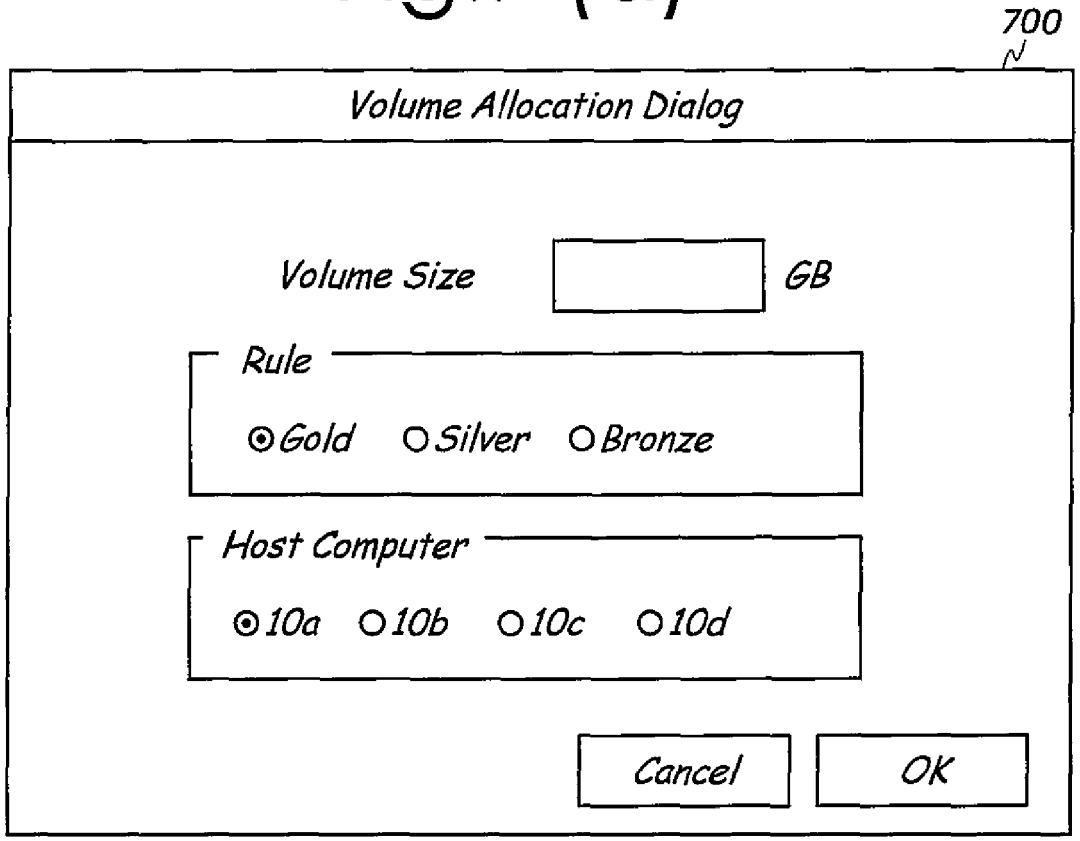
FIG. 7(a)-(c) illustrates dialog shown on screen by volume provisioning program.
Figure 7:
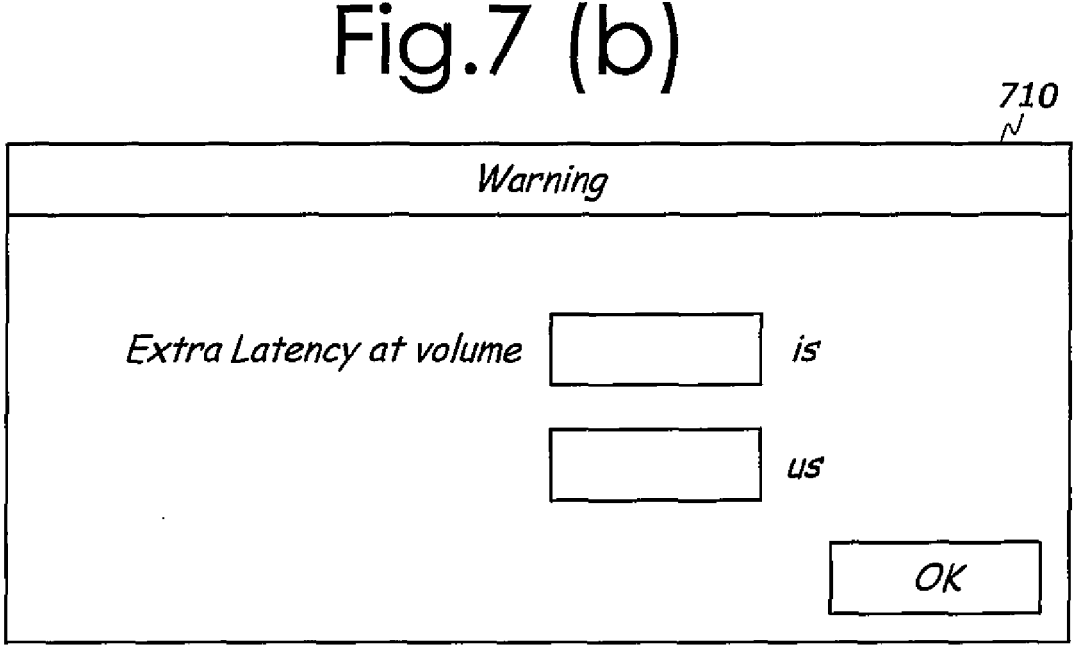

Provisioning Gold Volume:
FIG. 6 shows the process flow for allocating a volume.
STEP 602: An administrator inputs volume size on the management computer 500. The volume provisioning program 5202 shows dialog 700 in FIG. 7(a) on the screen. Now an administrator input 100 GB to the dialog 700. The volume size is stored in the VSIZE variable.
STEP 604: An administrator selects the rule, which is shown on the dialog 700. Now an administrator selects "Gold" in the dialog 700.
STEP 606: An administrator selects the host computer, which uses the new volume. Now an administrator indicates the host computer 10a in the dialog 700.
STEP 610: If gold is selected, the volume provisioning program 5202 calls the gold algorism 612.
STEP 620: If silver is selected, the volume provisioning program 5202 calls the silver algorism 622.
STEP 630: If bronze is selected, the volume provisioning program 5202 calls the bronze algorism 632.

Figure 8:
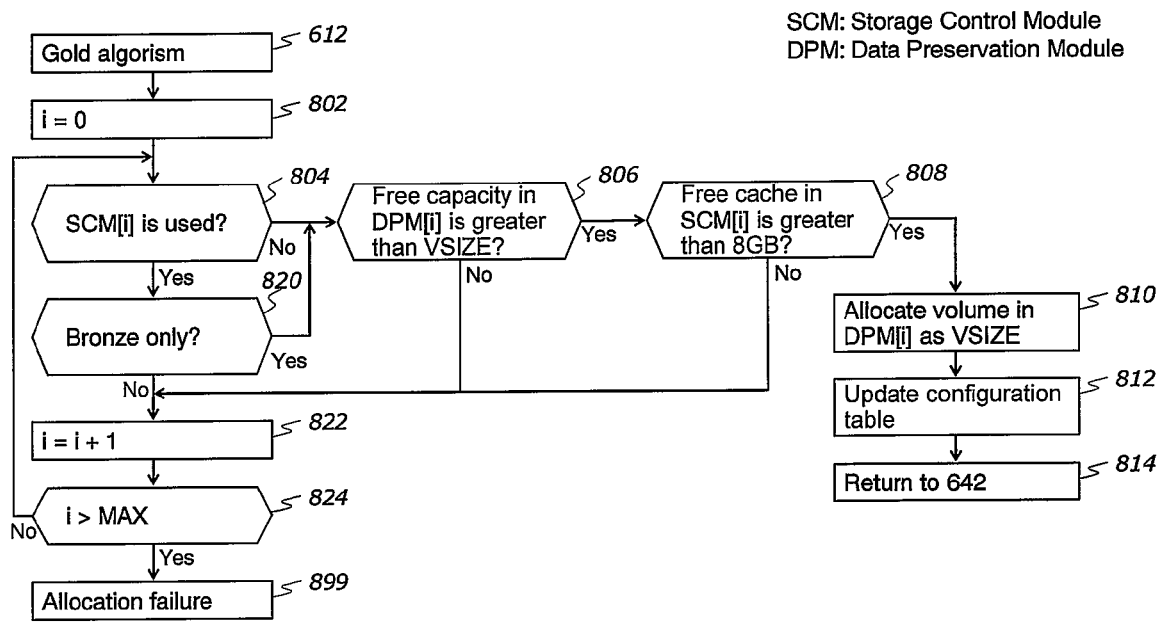
FIG. 8 illustrates exemplary control flow corresponding to gold algorism.

In this case, gold algorism 612 is called. FIG. 8 shows the flow for gold algorism.

STEP 802: The storage control module management program 1821 initializes "i" to zero. "i" is used for referring the storage control module 150 in this algorism. In the case of i=0, the storage control module 150a is referred. In the case of i=1, the storage control module 150b is referred. In the case of i=2, the storage control module 150c is referred.

STEP 804: The storage control module management program 1821 checks if storage control module 150 [i] is used or not by referring the configuration table. (In this case, FIG. 3(a), the storage control module 150a is not used.)

STEP 806: The storage control module management program 1821 checks data preservation module 190 [i] has free capacity, which is greater than VSIZE by referring the configuration table. (In this case, FIG. 3(a), the data preservation module 190a is not used and has 1000 GB free volume space.)

STEP 808: The storage control module management program 1821 checks storage control module 150 [i] has free cache, which is greater than 8 GB by referring the configuration table. (In this case, FIG. 3(a), the storage control module 150a has 10 GB free cache.)

STEP 810: The storage control module management program 1821 allocates a volume in the volume space 200 [i] in the data preservation module 190 [i]. (In this case, FIG. 3(a), the volume 101 is allocated in the volume space 200a in the data preservation module 190a.)

STEP 812: The storage control module management program 1821 updates the configuration table. (In this case, the configuration table is updated shown in FIG. 3(b))

STEP 814: Return to STEP 642 in the FIG. 6.

STEP 642: The volume provisioning program 5202 creates new Fibre Channel zone in the FCSW55 (In this case a zone management table is updated. FIG. 11(a) shows updated zone management table. Accesses from FCIF 15a to 155a are now allowed exclusively.)

STEP 644: The volume provisioning program 5202 sets LUN security (LUN masking). (In this case, a LUN security table in the storage controller module 150a is updated. FIG. 12(a) shows updated LUN security table. Accesses from FCIF 15a to the volume 101 are now allowed exclusively.)

FIG. 13(a) shows configuration after above sequences are completed.

Provisioning Another Gold Volume:
STEP 602: An administrator inputs volume size on the management computer 500. The volume provisioning program 5202 shows dialog 700 in FIG. 7(a) on the screen. Now an administrator input 100 GB to the dialog 700. The volume size is stored in the VSIZE variable.
STEP 604: An administrator selects the rule, which is shown on the dialog 700. Now an administrator selects "Gold" again in the dialog 700.
STEP 606: An administrator selects the host computer, which uses the new volume. Now an administrator indicates the host computer 10b in the dialog 700.
STEP 610: If gold is selected, the volume provisioning program 5202 call the gold algorism 612. (In this case, gold algorism 612 is called.)
STEP 802: The storage control module management program 1821 initializes "i" to zero.
STEP 804: The storage control module management program 1821 checks if storage control module 150 [i] is used or not by referring the configuration table. (In this case, FIG. 3(b), the storage control module 150a is now used by the volume 101 with gold.)

STEP 820: The storage control module management program 1821 checks storage control module 150 [i] is used by only volumes with bronze rule. (In this case, FIG. 3(b), the storage control module 150a is now used by the volume 101 with gold.)

STEP 822: The storage control module management program 1821 adds one to "i"

STEP 824: The storage control module management program 1821 checks if "i" is greater than MAX storage control module. (In this embodiment, MAX=3.)

STEP 806: The storage control module management program 1821 checks data preservation module 190 [i] has free capacity, which is greater than VSIZE by referring the configuration table. (Now i=1. In this case, FIG. 3(b), the data preservation module 190b is not used and has 1000 GB free volume space.)

STEP 808: The storage control module management program 1821 checks storage control module 150 [i] has free cache, which is greater than 8 GB by referring the configuration table. (In this case, FIG. 3(b), the storage control module 150b has 10 GB free cache.)

STEP 810: The storage control module management program 1821 allocates a volume in the volume space 200 [i] in the data preservation module 190 [i]. (In this case, FIG. 3(b), the volume 102 is allocated in the volume space 200b in the data preservation module 190b.)

STEP 812: The storage control module management program 1821 updates the configuration table. (In this case, the configuration table is updated shown in FIG. 3(c))

STEP 814: Return to STEP 642 in the FIG. 6.

STEP 642: The volume provisioning program 5202 creates new Fibre Channel zone in the FCSW55 (In this case a zone management table is updated. FIG. 11 (b) shows updated zone management table. Accesses from FCIF 15b to 155b are now allowed exclusively.)

STEP 644: The volume provisioning program 5202 sets LUN security (LUN masking). (In this case, a LUN security table in the storage controller module 150b is updated. FIG. 12(b) shows updated LUN security table. Accesses from FCIF 15b to the volume 102 are now allowed exclusively.)

FIG. 13(b) shows configuration after above sequences is done.

Provisioning Silver Volume:

Next silver volume provisioning is explained. FIG. 6 shows the flow for allocating a volume.

STEP 602: An administrator inputs volume size on the management computer 500. The volume provisioning program 5202 shows dialog 700 in FIG. 7 on the screen. Now an administrator input 500 GB to the dialog 700. The volume size is stored in the VSIZE variable.

STEP 604: An administrator selects the rule, which is shown on the dialog 700. Now an administrator selects "Silver" in the dialog 700.

STEP 606: An administrator selects the host computer, which uses the new volume. Now an administrator indicates the host computer 10c in the dialog 700.

STEP 620: If silver is selected, the volume provisioning program 5202 call the silver algorism 622. (In this case, silver algorism 622 is called.)

Figure 9:
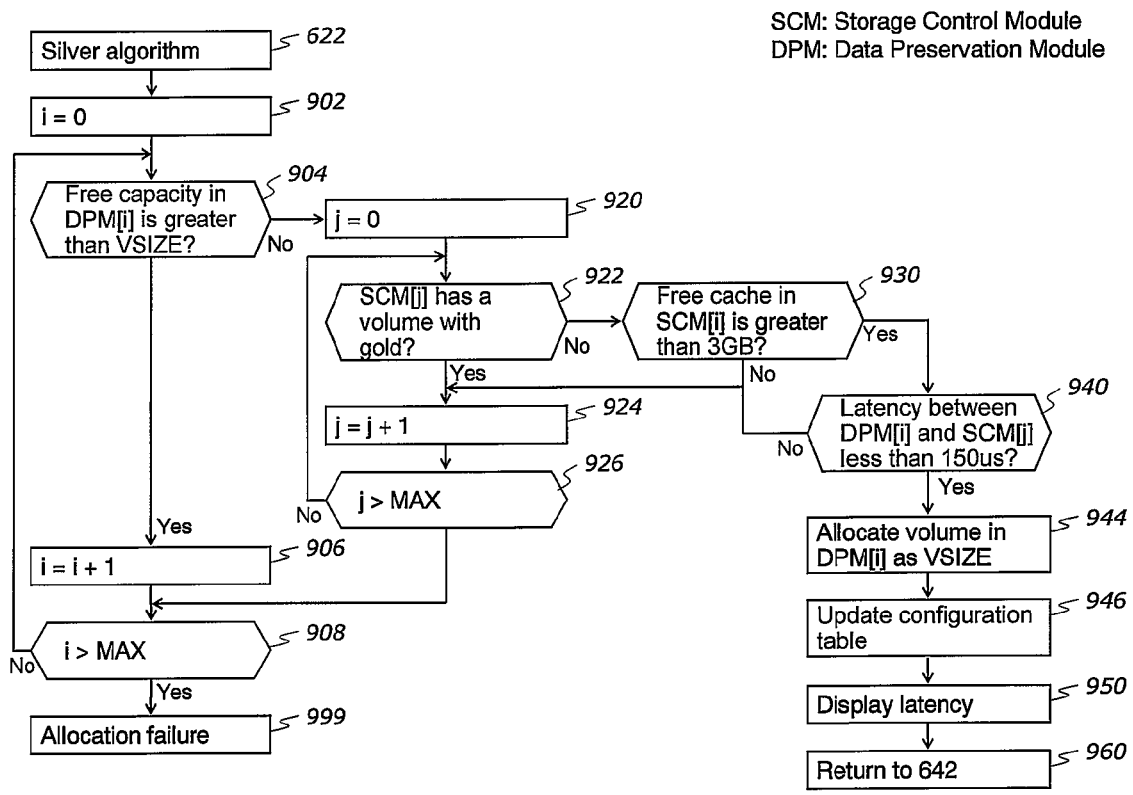
FIG. 9 illustrates exemplary control flow corresponding to silver algorism.
Figure 10:
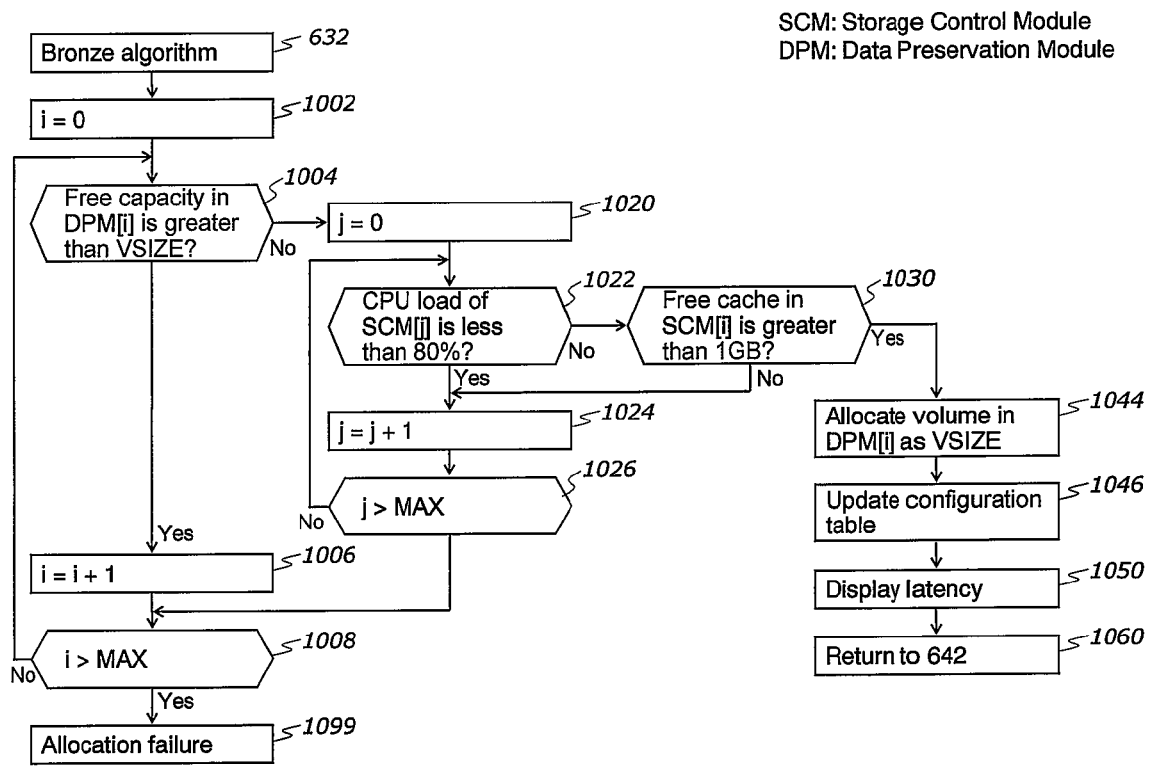
FIG. 10 illustrates exemplary control flow corresponding to bronze algorism.

STEP 902 (FIG. 9): The storage control module management program 1821 initializes "i" to zero. "i" is used for referring the data preservation module 190 in this algorism. In the case of i=0, the data preservation module 190a is referred. In the case of i=1, the data preservation module 190b is referred.

STEP 904: The storage control module management program 1821 checks if the data preservation module 190 [i] has free capacity, which is greater than VSIZE and no volume with gold rule by referring the configuration table. (In this case, FIG. 3(c), the data preservation module 190a has 900 GB free volume space. However the data preservation module 190a has the volume 101 with gold rule.)

STEP 906: The storage control module management program 1821 adds one to "i".

STEP 908: The storage control module management program 1821 checks if "i" is greater than MAX data preservation module. (In this embodiment, MAX=3.)

STEP 904: The storage control module management program 1821 checks if the data preservation module 190 [i] has free capacity, which is greater than VSIZE and no volume with gold rule by referring the configuration table. (Now i=1. In this case, FIG. 3(c), the data preservation module 190b has 900 GB free volume space. However the data preservation module 190b has the volume 102 with gold rule.)

STEP 906: The storage control module management program 1821 adds one to "i".

STEP 908: The storage control module management program 1821 checks if "i" is greater than MAX data preservation module.

STEP 904: The storage control module management program 1821 checks if the data preservation module 190 [i] has free capacity, which is greater than VSIZE and no volume with gold rule by referring the configuration table. (Now i=2. In this case, FIG. 3(c), the data preservation module 190c has 1000 GB free volume space and no volume.)

STEP 920: The storage control module management program 1821 initialized "j" to zero. "j" is used for referring the storage control module 150 in this algorism. In the case of j=0, the storage control module 150a is referred.

STEP 922: The storage control module management program 1821 checks if the storage control module 150 [j] has volume with gold rule. (In this case, FIG. 3(c), the data preservation module 190a has the volume 101 with gold rule.)

STEP 924: The storage control module management program 1821 adds one to "j".

STEP 926: The storage control module management program 1821 checks if "j" is greater than MAX storage control module.

STEP 922: The storage control module management program 1821 checks if the storage control module 150 [j] has volume with gold rule. (Now j=1. In this case, FIG. 3(c), the data preservation module 190b has the volume 102 with gold rule.)

STEP 924: The storage control module management program 1821 adds one to "j".

STEP 926: The storage control module management program 1821 checks if "j" is greater than MAX storage control module.

STEP 922: The storage control module management program 1821 checks if the storage control module 150 [j] has volume with gold rule. (Now j=2. In this case, FIG. 3(c), the data preservation module 190c has no volume.)

STEP 930: The storage control module management program 1821 checks storage control module 150 [j] has free cache, which is greater than 3 GB by referring the configuration table. (In this case, FIG. 3(c), the storage control module 190c (now j=2) has 10 GB free cache.)

STEP 940: The storage control module management program 1821 checks the latency table 1828 if the latency from the storage control module [j] to the data preservation module [i] is less than 150 us by referring the latency table 1828. (In this case, i=2, j=2. the latency from the storage controller module 150c to the data preservation module 190c is referred. So the extra latency is 0 us.)

STEP 944: The storage control module management program 1821 allocates a volume in the volume space 200 [i] in the data preservation module 190 [i]. (In this case, FIG. 3(b), the volume 103 is allocated in the volume space 200c in the data preservation module 190c.)

STEP 946: The storage control module management program 1821 updates the configuration table. (In this case, the configuration table is updated shown in FIG. 3(d))

STEP 950: The volume provisioning program 5202 shows the latency in the dialog 710 in FIG. 7(b). (In this case, 0 us is displayed in the dialog 710.)

STEP 960: Return to STEP 642 in the FIG. 6.

STEP 642: The volume provisioning program 5202 create new Fibre Channel zone in the FCSW55 (In this case a zone management table is updated. FIG. 11(c) shows updated zone management table. Accesses from FCIF 15c to 155c are now allowed exclusively.)

STEP 644: The volume provisioning program 5202 sets LUN security (LUN masking). (In this case, a LUN security table in the storage controller module 150c is updated. FIG. 12(c) shows updated LUN security table. Accesses from FCIF 15c to the volume 103 are now allowed exclusively.)

FIG. 13(c) shows configuration after above sequences is done.

Provisioning Bronze Volume:

Next bronze volume provisioning is explained. FIG. 6 shows the flow for allocating a volume.

STEP 602: An administrator inputs volume size on the management computer 500. The volume provisioning program 5202 shows dialog 700 in FIG. 7 on the screen. Now an administrator input 800 GB to the dialog 700. The volume size is stored in the VSIZE variable.

STEP 604: An administrator selects the rule, which is shown on the dialog 700. Now an administrator selects "Bronze" in the dialog 700.

STEP 606: An administrator selects the host computer, which uses the new volume. Now an administrator indicates the host computer 10d in the dialog 700.

STEP 630: If bronze is selected, the volume provisioning program 5202 call the bronze algorism 632. (In this case, bronze algorism 632 is called.)

STEP 1002: The storage control module management program 1821 initializes "i" to zero. "i" is used for referring the data preservation module 190 in this algorism. In the case of i=0, the data preservation module 190a is referred. In the case of i=1, the data preservation module 190b is referred.

STEP 1004: The storage control module management program 1821 checks if the data preservation module 190 [i] has free capacity, which is greater than VSIZE by referring the configuration table. (In this case, FIG. 3(d), the data preservation module 1 90a has 900 GB free volume space.)

STEP 1020: The storage control module management program 1821 initialized "j" to zero. "j" is used for referring the storage control module 150 in this algorism. In the case of j=0, the storage control module 150a is referred.

STEP 1022: The storage control module management program 1821 checks CPU load in the storage control module 150 [j]. If CPU load is greater than 80%, the storage control module is not used for controlling the volume, which is allocated in this sequence. (In this case, FIG. 3(d), CPU load in the storage control module 150a is 100%.)

STEP 1024: The storage control module management program 1821 adds one to "j".

STEP 1026: The storage control module management program 1821 checks if "j" is greater than MAX storage control module.

STEP 1022: The storage control module management program 1821 checks CPU load in the storage control module 150 [j]. If CPU load is greater than 80%, the storage control module is not used for controlling the volume, which is allocated in this sequence. (Now j=1, In this case, FIG. 3(d), CPU load in the storage control module 150b is 100%.)

STEP 1024: The storage control module management program 1821 adds one to "j".

STEP 1026: The storage control module management program 1821 checks if "j" is greater than MAX storage control module.

STEP 1022: The storage control module management program 1821 checks CPU load in the storage control module 150 [j]. If CPU load is greater than 80%, the storage control module is not used for controlling the volume, which is allocated in this sequence. (Now j=2, In this case, FIG. 3(d), CPU load in the storage control module 150c is 25%.)

STEP 1030: The storage control module management program 1821 checks if storage control module 150 [j] has free cache, which is greater than 1 GB by referring the configuration table. (In this case, FIG. 3(d), the storage control module 190a (now j=2) has 7 GB free cache.)

STEP 1044: The storage control module management program 1821 allocates a volume in the volume space 200 [i] in the data preservation module 190 [i]. (In this case, FIG. 3(d), the volume 104 is allocated in the volume space 200a in the data preservation module 190a.)

STEP 1046: The storage control module management program 1821 updates the configuration table. (In this case, the configuration table is updated shown in FIG. 3(e))

STEP 1050: The volume provisioning program 5202 shows the latency in the dialog 710 in FIG. 7(b). The storage control module management program 1821 gets the latency from the storage control modules to the data preservation module [i] by referring the latency table 1828 and report to the volume provisioning program 5202. (In this case, i=0, j=2. the latency from the storage controller module 150c to the data preservation module 190a is referred. So the extra latency is 200 us. 200 us is displayed in the dialog 710.)

STEP 1060: Return to STEP 642 in the FIG. 6.

STEP 642: The volume provisioning program 5202 creates new Fibre Channel zone in the FCSW55 (In this case a zone management table is updated. FIG. 11(d) shows updated zone management table. Accesses from FCIF 15d to 155c are now allowed. FCIF 15c and FCIF 15d can access to FCIF 155c.)

STEP 644: The volume provisioning program 5202 sets LUN security (LUN masking). (In this case, a LUN security table in the storage controller module 150c is updated. FIG. 12(d) shows updated LUN security table. Accesses from FCIF 15d to the volume 104 are now allowed exclusively.)

FIG. 13(d) shows configuration after above sequences is done.

Figure 14:
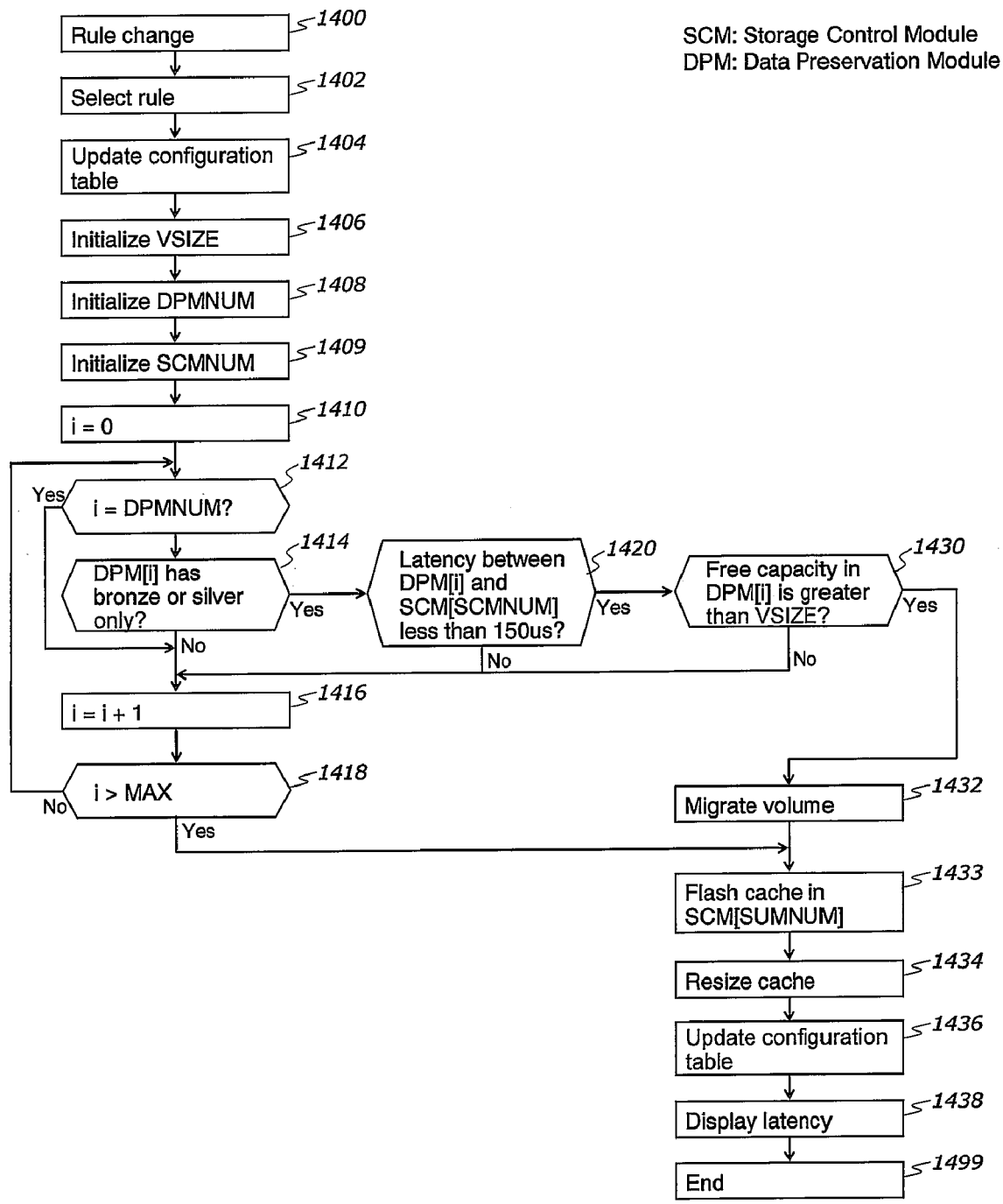
FIG. 14 illustrates operation control flow in case of changing rule.

In the Case of Changing Rule (1):

In this section, the case of changing the rule is explained. FIG. 14 shows the operational flow in the case of changing the rule. The volume provisioning program 5202 re-evaluates volume configuration for creating largest continuous free space in volume space. The flow is explained with FIG. 3(e) initial condition.

STEP 1402: The volume provisioning program 5202 shows dialog 720 in FIG. 7(c) on the screen. The administrator can change the rule in the dialog. (In this case, an administrator changes the rule for the volume 102 from gold to silver.)

STEP 1404: The storage control module management program 1821 updates the configuration table. (In this case, the configuration table is updated shown in FIG. 3(*f*))

STEP 1406: The volume provisioning program 5202 initializes VSIZE from the configuration table. (In this case, VSIZE is initialized as 100 GB. Size of the volume 102 is 100 GB.)

STEP 1408: The volume provisioning program 5202 initializes DPMNUM (Data Preservation Module Number) from the configuration table. (In this case, DPMNUM is initialized as 1. The volume 102 is allocated in the data preservation module 190*b*.)

STEP 1409: The volume provisioning program 5202 initializes SCMNUM (Storage Control Module Number) from the configuration table. (In this case, SCMNUM is initialized as 1. The volume 102 is managed by the storage control module 150*b*.)

STEP 1410: The storage control module management program 1821 initializes "i" to zero. "i" is used for referring the data preservation module 190 in this algorism. In the case of i=0, the data preservation module 190*a* is referred.

STEP 1412: The storage control module management program 1821 checks if i is DPMNUM. (In this case i=0 and DPMNUM=1)

STEP 1414: The storage control module management program 1821 checks if the data preservation module 190 [i] has another volume, which rule is only bronze or silver. (In this case, FIG. 3(*e*), the data preservation module 190*a* has the volume 101 with gold rule.)

STEP 1416: The storage control module management program 1821 adds one to "i".

STEP 1418: The storage control module management program 1821 checks if "i" is greater than MAX data preservation module.

STEP 1412: The storage control module management program 1821 checks if i is DPMNUM. (In this case i=1 and DPMNUM=1)

STEP 1416: The storage control module management program 1821 adds one to "i".

STEP 1418: The storage control module management program 1821 checks if "i" is greater than MAX data preservation module.

STEP 1412: The storage control module management program 1821 checks if i is DPMNUM. (In this case i=2 and DPMNUM=1)

STEP 1414: The storage control module management program 1821 checks if the data preservation module 190 [i] has another volume, which rule is only bronze or silver. (Now i=2. In this case, FIG. 3(*e*), the data preservation module 190*c* has the volume 103 with silver rule.)

STEP 1420: The storage control module management program 1821 checks the latency table 1828 if the latency from the storage control module [SCMNUM] to the data preservation module [i] is less than 150 us by referring the latency table 1828. (In this case, SCMNUM=1, i=2. the latency from the storage controller module 150*b* to the data preservation module 190*c* is referred. So the extra latency is 100 us.)

STEP 1430: The storage control module management program 1821 checks whether the data preservation module 190 [i] has free capacity, which is greater than VSIZE by referring the configuration table. (Now i=2. In this case, FIG. 3(*f*), the data preservation module 190*c* has 500 GB free volume space.)

STEP 1432: The storage control module management program 1821 asks the volume migration program 1523 to migrate the volume. (In this case, the volume migration program 1523 migrates the volume 102 from the data preservation module 190*b* to 190*c*.)

STEP 1433: If the cache has dirty data, the dirty data must be flushed before resize. The storage control module management program 1821 flashes the cache.

STEP 1434: The storage control module management program 1821 resize cache size. (In this case, cache size is resized from 8 GB to 3 GB for aligning the silver rule.)

STEP 1436: The storage control module management program 1821 updates the configuration table. (In this case, the configuration table is updated shown in FIG. 3(*g*))

STEP 1438: The volume provisioning program 5202 shows the latency in the dialog 710 in FIG. 7(*b*). (In this case, 100 us is displayed in the dialog 710.)

Figure 13:
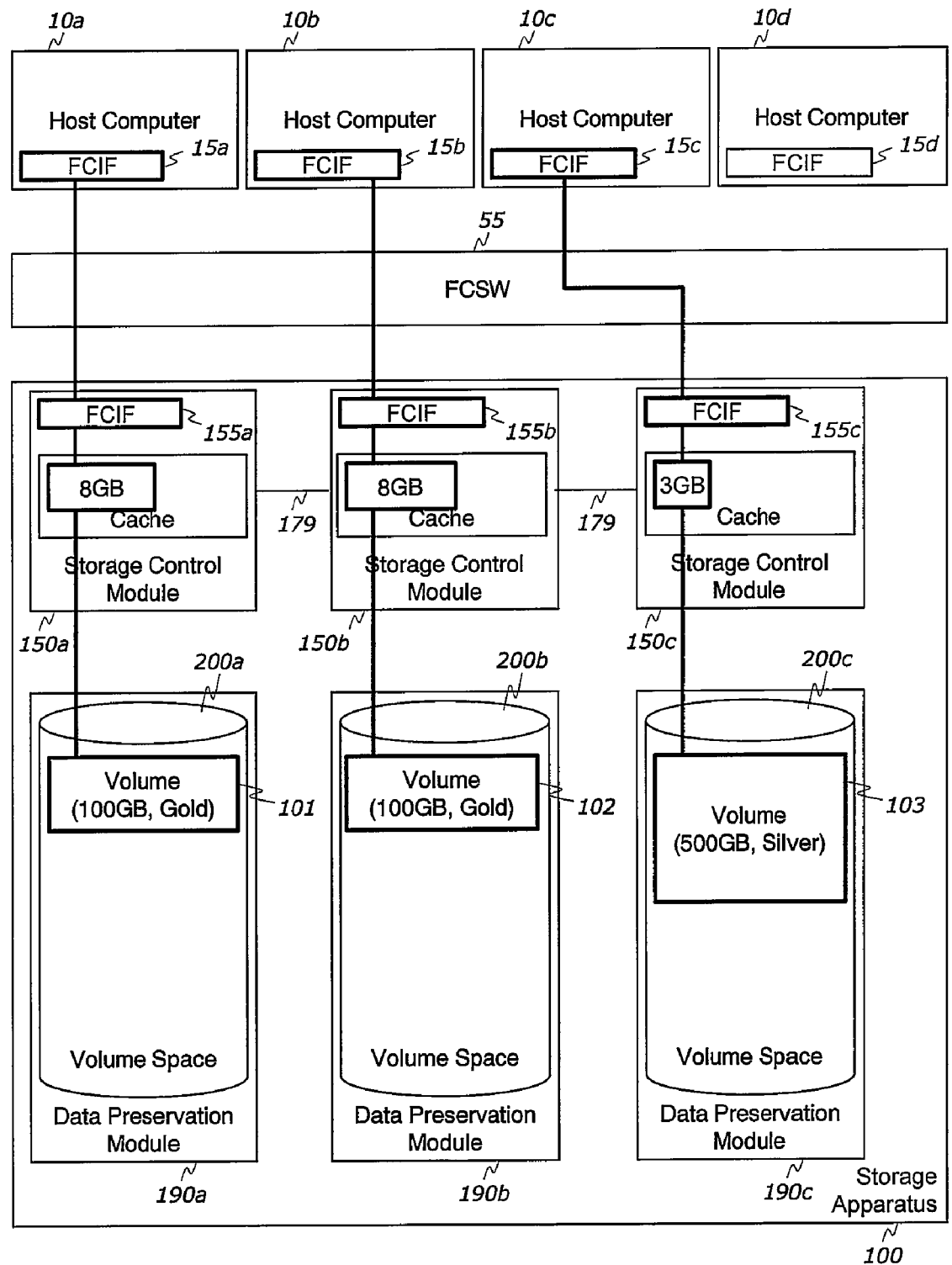
FIG. 13(a)-(g) illustrate various embodiments of system configurations.
Figure 13:
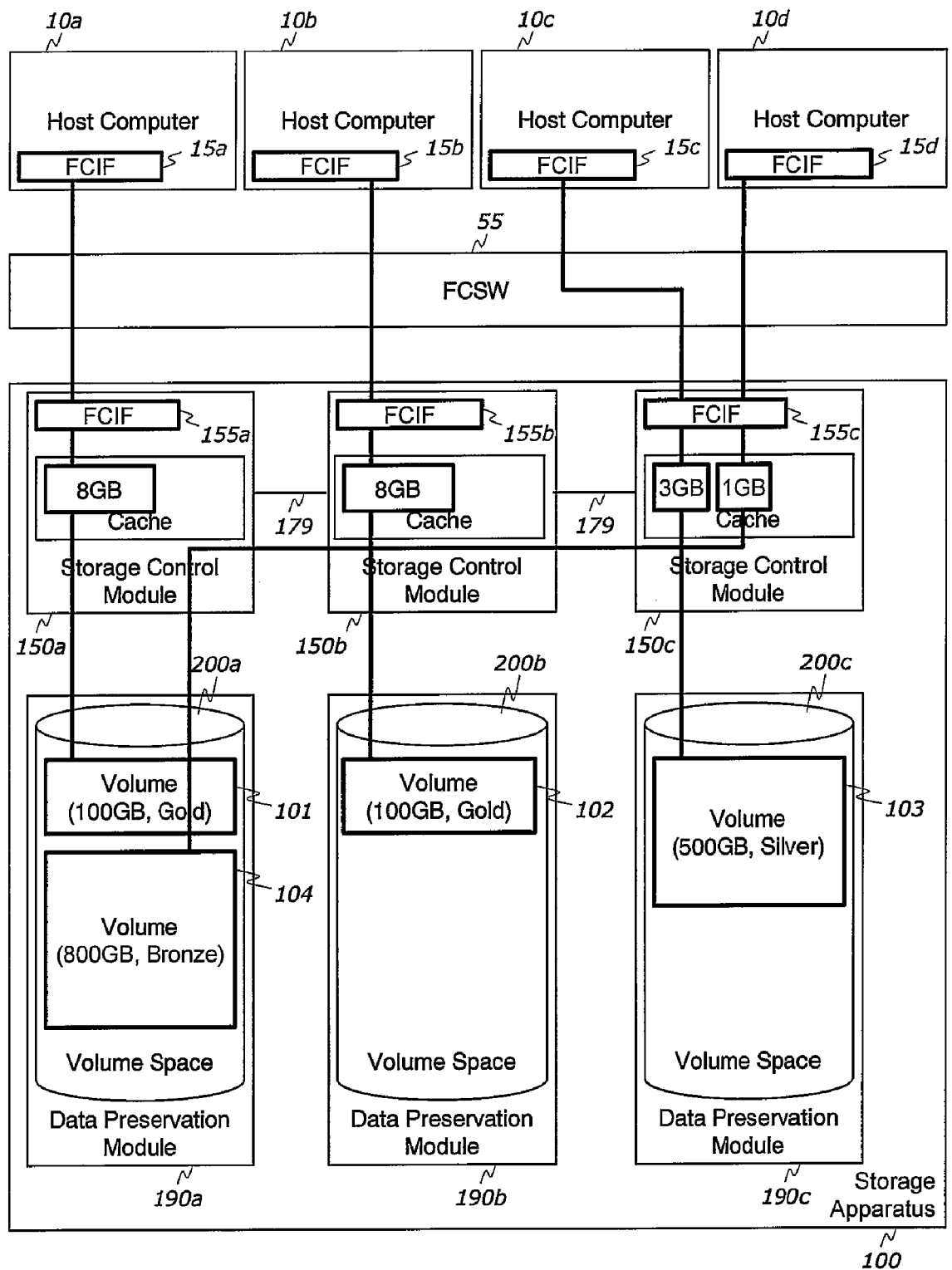
Figure 13:
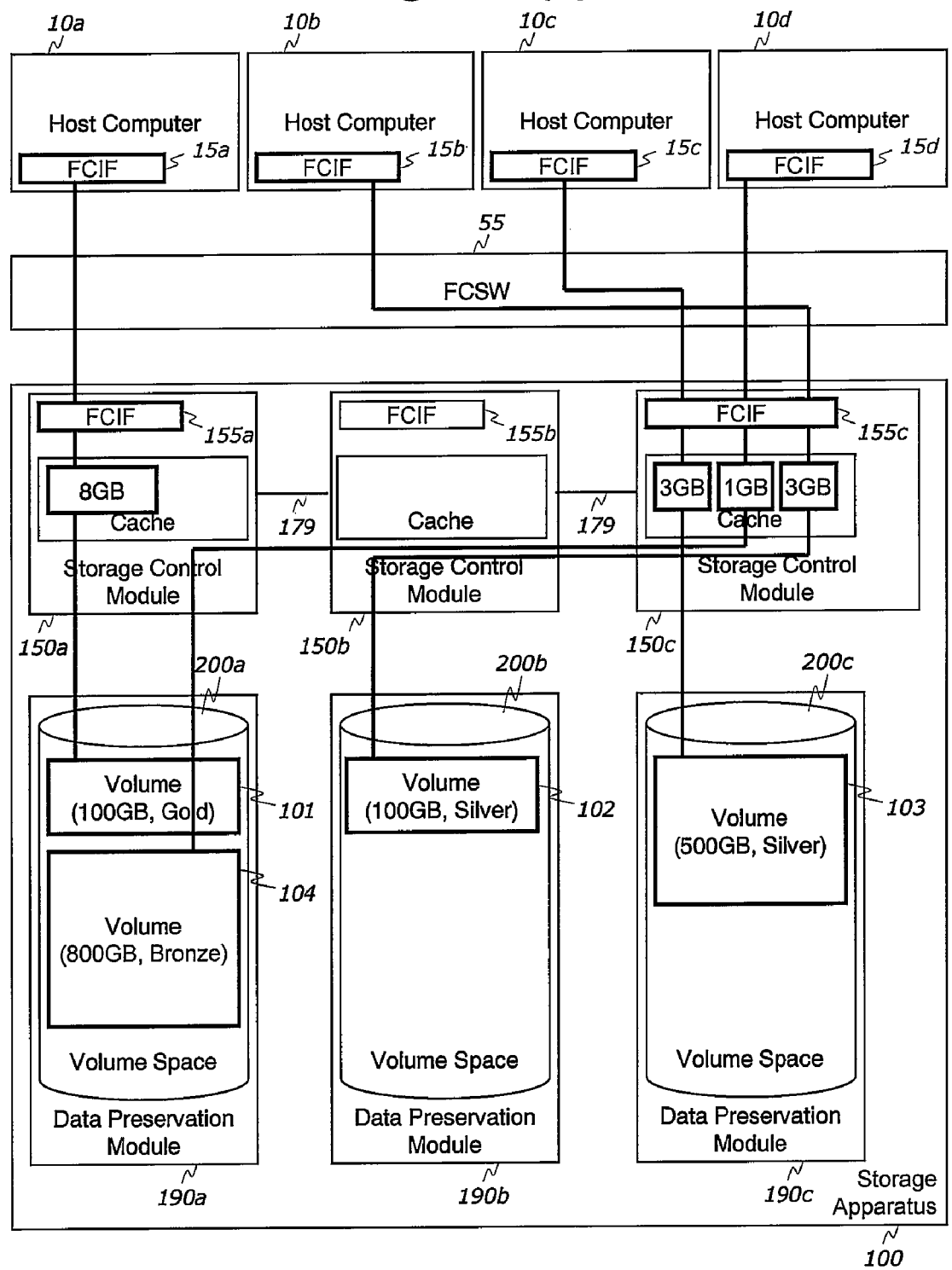

FIG. 13(*e*) shows the configuration after the above sequences have been completed. The largest free space in the volume space 200*b* is created by migrating the volume 102. Thus, if a volume allocation request with 1000 GB is requested, the storage apparatus 100 can allocate it. So there is no volume in the data preservation module 190*b*. The storage control module management program 1821 may power off the data preservation module 190*b*.

Figure 15:
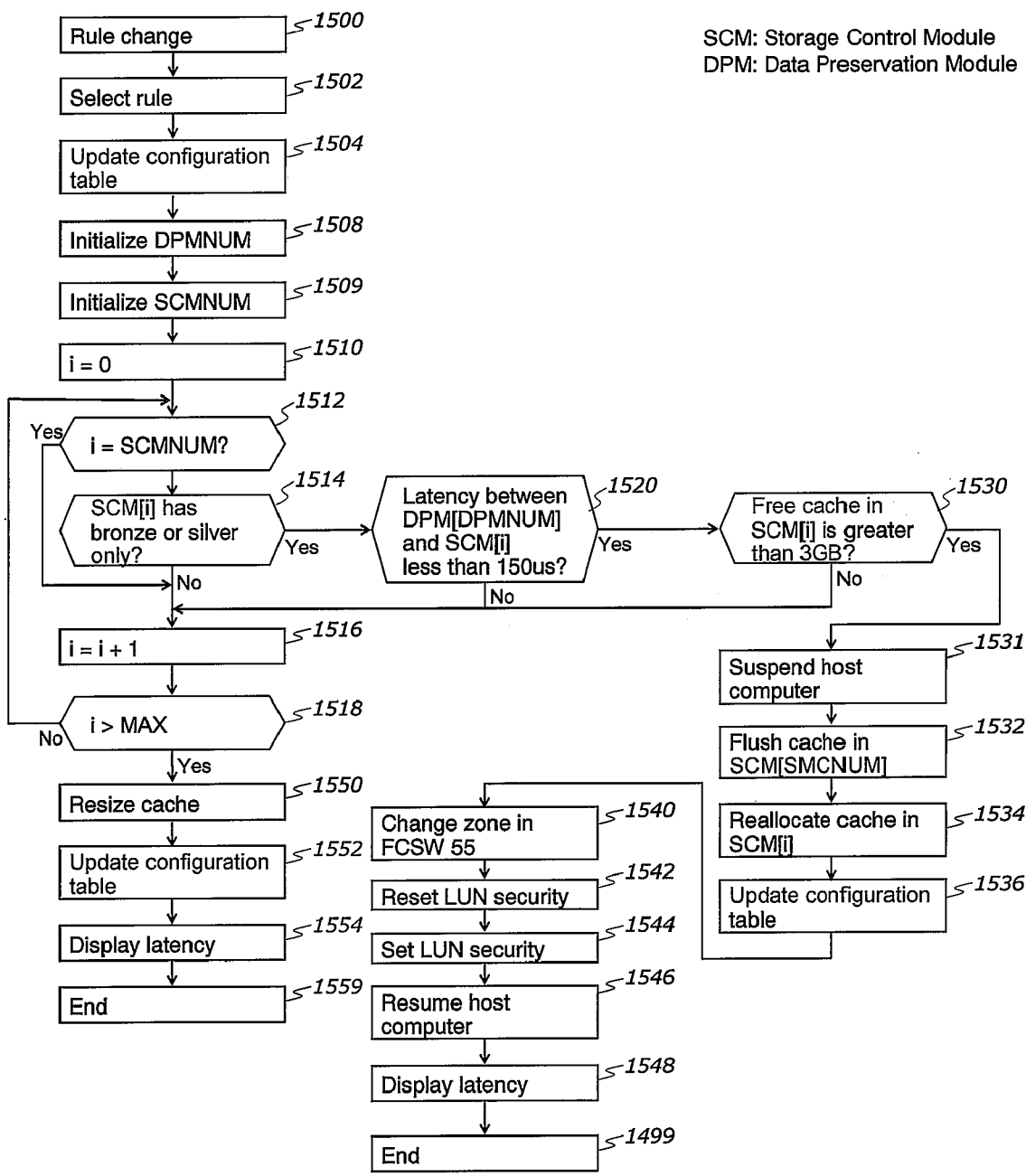
FIG. 15 illustrates operation control flow in case of changing rule.

In the Case of Changing Rule (2):

In this section, the case of changing the rule is explained. FIG. 15 shows the flow in the case of changing the rule. The volume provisioning program 5202 re-evaluates cache configuration for creating largest free space in cache. The flow is explained with FIG. 3(*e*) initial condition.

STEP 1502: The volume provisioning program 5202 shows dialog 720 in FIG. 7(*c*) on the screen. The administrator can change the rule in the dialog. (In this case, an administrator changes the rule for the volume 102 from gold to silver.)

STEP 1504: The storage control module management program 1821 updates the configuration table. (In this case, the configuration table is updated shown in FIG. 3(*f*))

STEP 1508: The volume provisioning program 5202 initializes DPMNUM (Data Preservation Module Number) from the configuration table. (In this case, DPMNUM is initialized as 1. The volume 102 is allocated in the data preservation module 190*b*.)

STEP 1509: The volume provisioning program 5202 initializes SCMNUM (Storage Control Module Number) from the configuration table. (In this case, SCMNUM is initialized as 1. The volume 102 is managed by the storage control module 150*b*.)

STEP 1510: The storage control module management program 1821 initializes "i" to zero. "i" is used for referring the storage control module 150 in this algorism. In the case of i=0, the storage control module 150*a* is referred.

STEP 1512: The storage control module management program 1821 checks if i is SCMNUM. (In this case i=0 and SCMNUM=1)

STEP 1514: The storage control module management program 1821 checks if the storage control module 150 [i] has cache, which rule is only bronze or silver. (In this case, FIG. 3(*e*), the storage control module 150*a* has the cache for the volume 101 with gold rule and the volume 104 with bronze rule.)

STEP 1516: The storage control module management program 1821 adds one to "i".

STEP 1518: The storage control module management program 1821 checks if "i" is greater than MAX data preservation module.

STEP 1512: The storage control module management program 1821 checks if i is SCMNUM. (In this case i=1 and SCMNUM=1)

STEP 1516: The storage control module management program 1821 adds one to "i".

STEP 1518: The storage control module management program 1821 checks if "i" is greater than MAX data preservation module.

STEP 1512: The storage control module management program 1821 checks if i is SCMNUM. (In this case i=2 and SCMNUM=1)

STEP 1514: The storage control module management program 1821 checks if the storage control module 190 [i] has cache, which rule is only bronze or silver. (Now i=2. In this case, FIG. 3(*e*), the storage control module 190*c* has the cache for the volume 103 with silver rule.)

STEP 1520: The storage control module management program 1821 checks the latency table 1828 if the latency from the storage control module [i] to the data preservation module [DPMNUM] is less than 150 us by referring the latency table 1828. (In this case, i=2, DPMNUM=1. the latency from the storage controller module 150*c* to the data preservation module 190*b* is referred. So the extra latency is 100 us.)

STEP 1530: The storage control module management program 1821 checks the storage control module 150 [i] has free cache, which is greater than 3 GB by referring the configuration table. (Now i=2. In this case, FIG. 3(*f* the storage control module 150*c* has 6 GB free cache.)

STEP 1531: The volume provisioning program 5202 suspends the host computer. (In this case, the host computer 10*b* is suspended.)

STEP 1532: The storage control module management program 1821 flushes the cache. (In this case, the cache for the volume 102 in the storage control module 150*b* is flushed.)

STEP 1534: The storage control module management program 1821 reallocates the cache. (In this case, the 3 GB size of cache for the volume 102 is reallocated in the storage control module 150*c*.)

STEP 1536: The storage control module management program 1821 updates the configuration table. (In this case, the configuration table is updated shown in FIG. 3(*h*))

STEP 1540: The volume provisioning program 5202 changes Fibre Channel zone in the FCSW55 (In this case a zone management table is updated. FIG. 11(*e*) shows updated zone management table. Accesses from FCIF 15*b* to 155*c* are now allowed. FCIF 15*b*, 15*c* and 15*d* can access to FCIF 155*c*.)

STEP 1542: The volume provisioning program 5202 resets LUN security (LUN masking). (In this case, a LUN security table in the storage controller module 150*b* is reseted. FIG. 12(*e*) shows reseted LUN security table. Accesses from FCIF 15*b* to the volume 102 are now prohibited at the storage control module 150*b*.)

STEP 1544: The volume provisioning program 5202 sets LUN security (LUN masking). (In this case, a LUN security table in the storage controller module 150*c* is updated. FIG. 12(*f*) shows updated LUN security table. Accesses from FCIF 15*b* to the volume 102 are now allowed exclusively at the storage control module 150*c*.)

STEP 1546: The volume provisioning program 5202 resumes the host computer. (In this case, the host computer 10*b* is resumed.)

STEP 1548: The volume provisioning program 5202 shows the latency in the dialog 710 in FIG. 7(*b*). (In this case, 100 us is displayed in the dialog 710.)

FIG. 13(*f*) shows configuration after above sequences is done. The largest free cache in the storage control module 150*b* is created by changing the cache allocation at the storage control module for the volume 102. So if a volume allocation request with large cache size is requested, the storage apparatus 100 can allocate it. So there is no cache and volume in the storage control module 150*b*. The storage control module does not manage any volumes. The storage control module management program 1821 may power off the storage control module 150*b* except the IIF 154, if the interconnect 179 is cascaded.

In the Case of Changing Rule (1) & (2):

Both flows shown in FIG. 14 and FIG. 15 can be applied. FIG. 13(*g*) shows results of configuration in the case of both flows that is applied to the FIG. 3(*e*). The largest free space in the volume space 200*b* is created by migrating the volume 102. The largest free cache in the storage control module 150*b* is created by changing the cache allocation at the storage control module for the volume 102. So there is no volume in the data preservation module 190*b* and there is no cache and volume in the storage control module 150*b*. The storage control module management program 1821 may power off the data preservation module 190*b* and the storage control module 150*b*. An administrator does not need to know internal storage architecture for power off.

Other Embodiments

Figure 16:
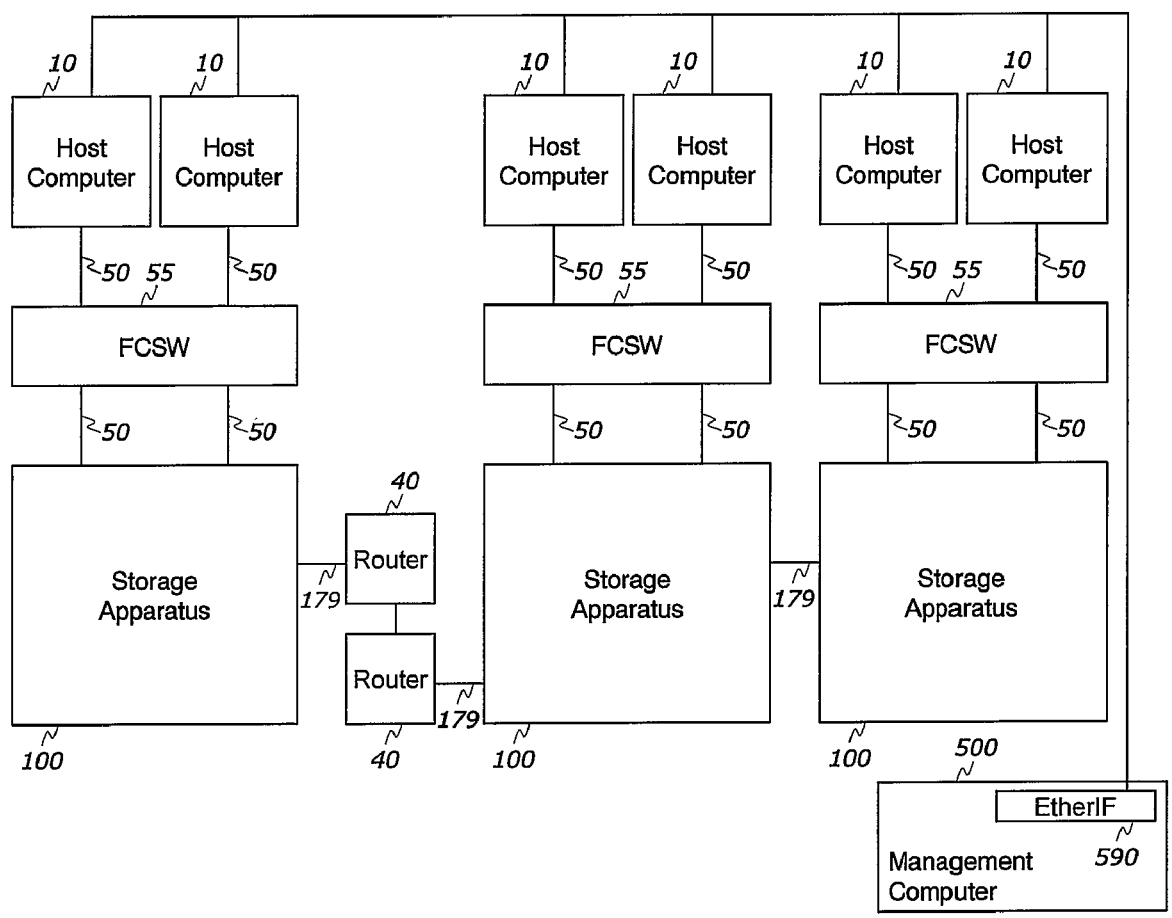
FIG. 16 illustrates an alternative embodiment of system configuration.

FIG. 16 shows another alternative embodiment of the system configuration. The system may have plural storage apparatus 100 and connected each other by interconnects. If the router 40 is used, extra latency is probably longer than internal one. However the storage control module management module has the measuring latency program 1522. So the latency among the storage apparatuses is measured correctly and reported to the management computer 500. Another rule may be used for supporting long latency.

Figure 17:
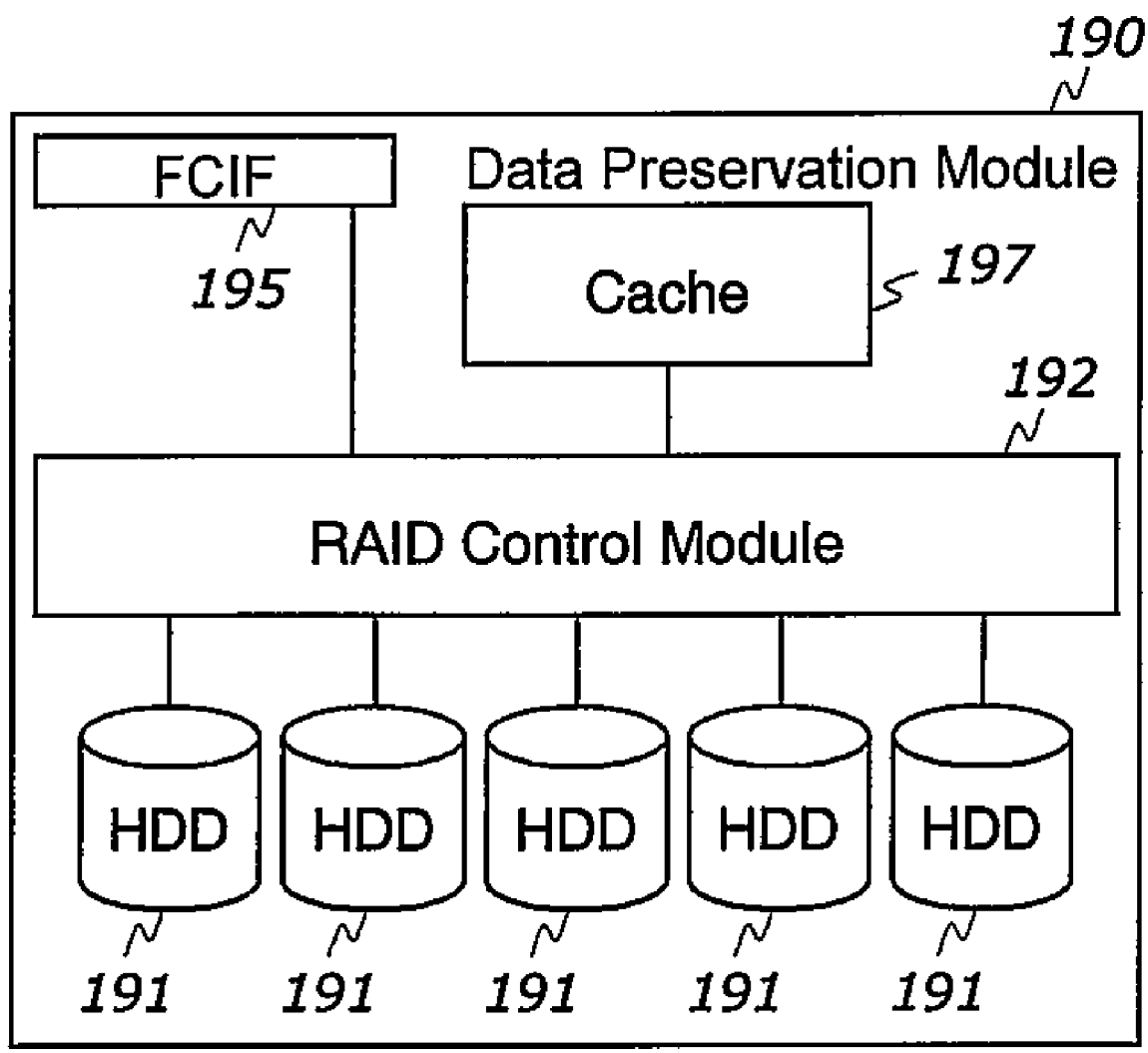
FIG. 17 illustrates an exemplary embodiment of a data preservation module.

FIG. 17 shows the variation of the data preservation module. This data preservation module 190 is composed of:

One or more HDDs 191.

FCIF195 for connecting to the storage control module 150.

RAID control module 192 for applying data protection by RAID algorism.

Cache 197 for keeping data temporally for accelerating request responses from the storage control module 150.

In the case of using this type of data preservation module, the storage control module 150 does not need to execute RAID algorism. So load is distributed to the RAID control module 192.

Figure 18B:
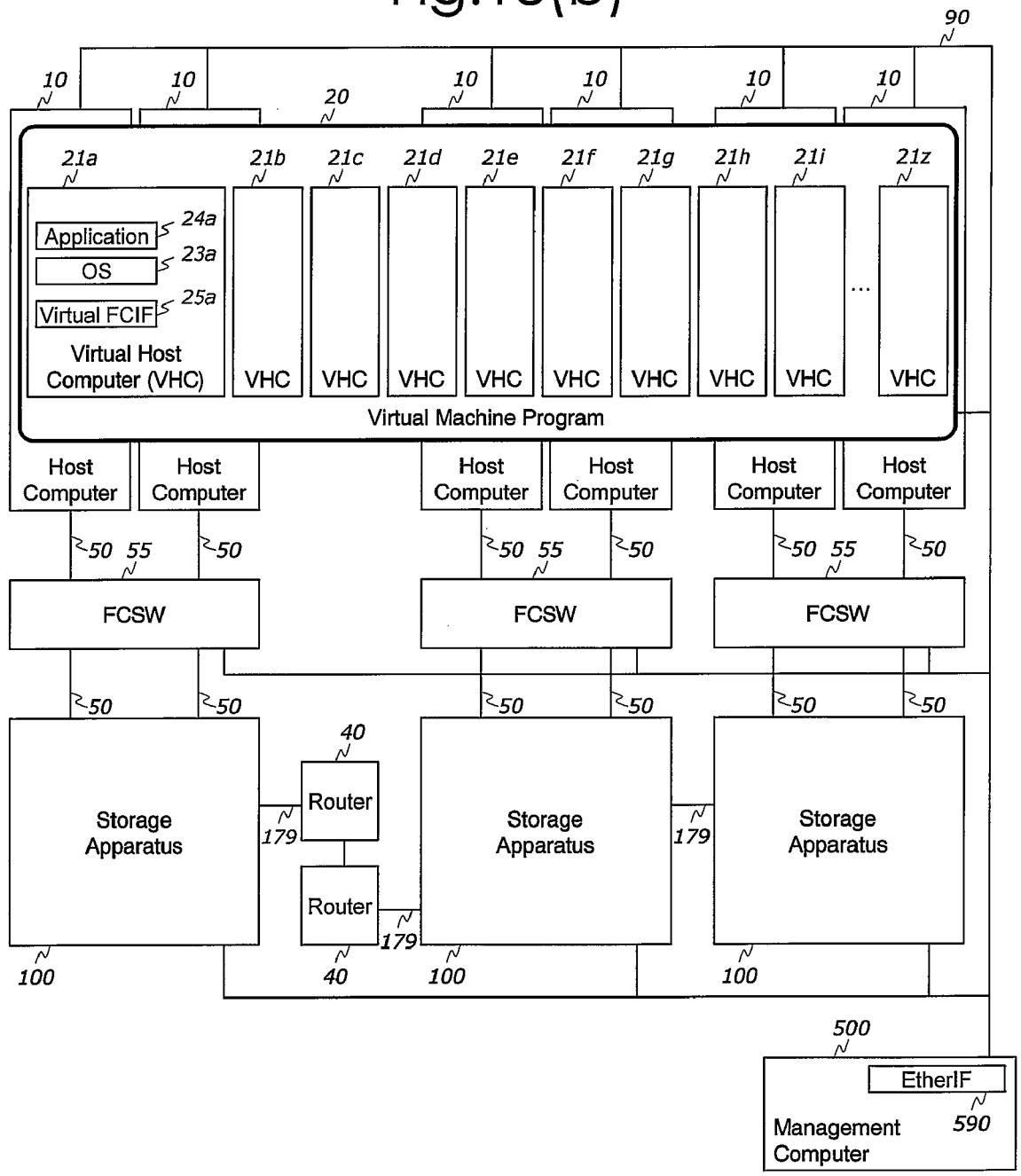
FIG. 18(a) and (b) illustrate alternative embodiments of system configuration.

FIG. 18(*a*) and (*b*) show the variation of system configuration. The system may have the virtual machine program for running virtual host computer. Virtual machine program can run large number of virtual host computer 21 on the plural host computer 10 beyond the number of the physical host computer 10. The management computer 500 can control to suspend and resume the virtual host computer 21 via the virtual machine program 20. In this case, zone is created in the FCSW 55 by the WWN of virtual FCIF 25. Also LUN security is set by the WWN of virtual FCIF.

Figure 19:
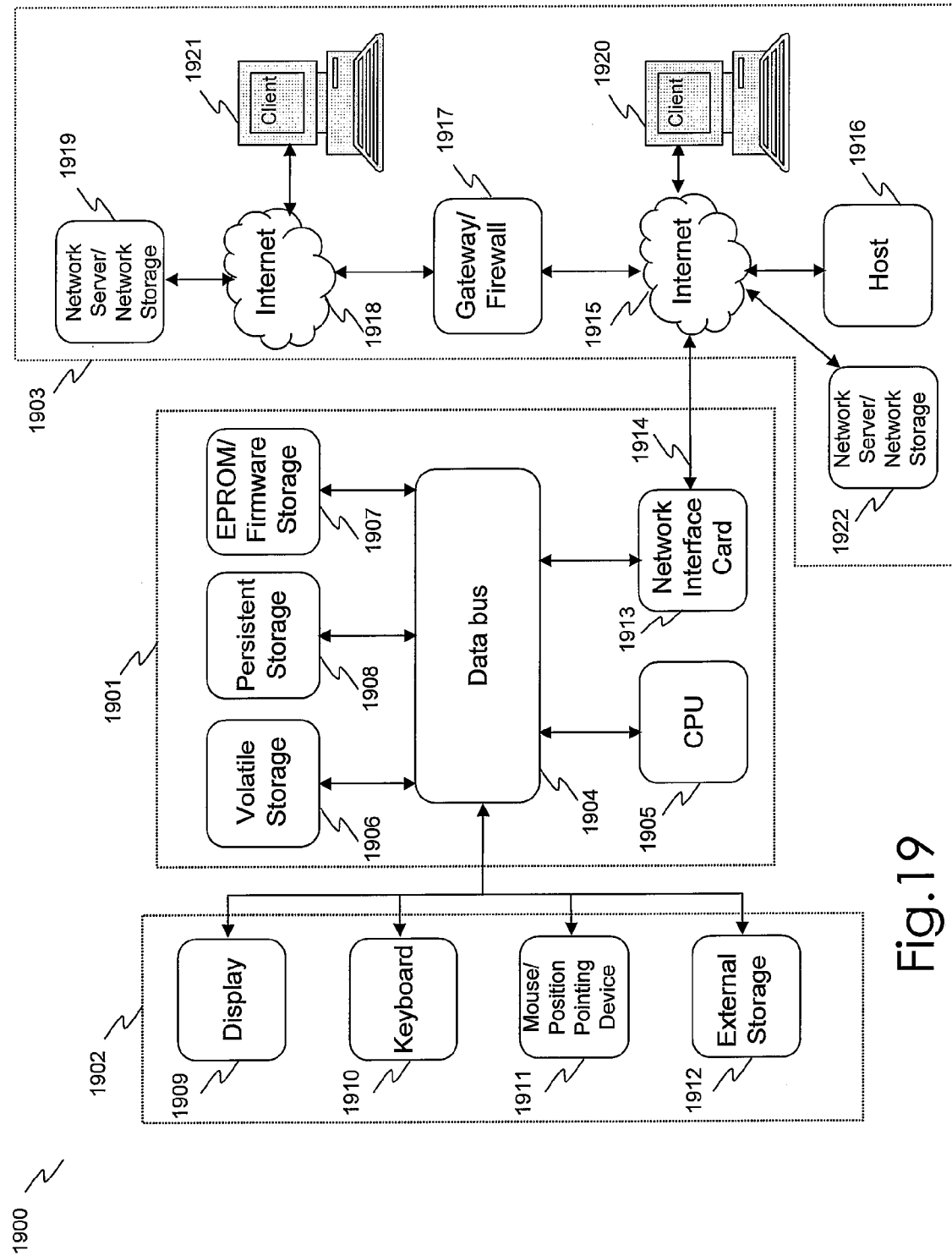
FIG. 19 illustrates an exemplary embodiment of a computer platform upon which the inventive system may be implemented.

Exemplary Computer Platform:

FIG. 19 is a block diagram that illustrates an embodiment of a computer/server system 1900 upon which an embodiment of the inventive methodology may be implemented. The system 1900 includes a computer/server platform 1901, peripheral devices 1902 and network resources 1903.

The computer platform 1901 may include a data bus 1904 or other communication mechanism for communicating information across and among various parts of the computer platform 1901, and a processor 1905 coupled with bus 1901 for processing information and performing other computational and control tasks. Computer platform 1901 also includes a volatile storage 1906, such as a random access memory (RAM) or other dynamic storage device, coupled to bus 1904 for storing various information as well as instructions to be executed by processor 1905. The volatile storage 1906 also may be used for storing temporary variables or other intermediate information during execution of instructions by processor 1905. Computer platform 1901 may further include a read only memory (ROM or EPROM) 1907 or other static storage device coupled to bus 1904 for storing static information and instructions for processor 1905, such as basic input-output system (BIOS), as well as various system configuration parameters. A persistent storage device 1908, such as a magnetic disk, optical disk, or solid-state flash memory device is provided and coupled to bus 1901 for storing information and instructions.

Computer platform 1901 may be coupled via bus 1904 to a display 1909, such as a cathode ray tube (CRT), plasma display, or a liquid crystal display (LCD), for displaying information to a system administrator or user of the computer platform 1901. An input device 1910, including alphanumeric and other keys, is coupled to bus 1901 for communicating information and command selections to processor 1905. Another type of user input device is cursor control device 1911, such as a mouse, a trackball, or cursor direction keys for communicating direction information and command selections to processor 1904 and for controlling cursor movement on display 1909. This input device typically has two degrees of freedom in two axes, a first axis (e.g., x) and a second axis (e.g., y), that allows the device to specify positions in a plane.

An external storage device 1912 may be connected to the computer platform 1901 via bus 1904 to provide an extra or removable storage capacity for the computer platform 1901. In an embodiment of the computer system 1900, the external removable storage device 1912 may be used to facilitate exchange of data with other computer systems.

The invention is related to the use of computer system 1900 for implementing the techniques described herein. In an embodiment, the inventive system may reside on a machine such as computer platform 1901. According to one embodiment of the invention, the techniques described herein are performed by computer system 1900 in response to processor 1905 executing one or more sequences of one or more instructions contained in the volatile memory 1906. Such instructions may be read into volatile memory 1906 from another computer-readable medium, such as persistent storage device 1908. Execution of the sequences of instructions contained in the volatile memory 1906 causes processor 1905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1908. Volatile media includes dynamic memory, such as volatile storage 1906. Transmission media includes coaxial cables, copper wire and fiber optics, including the wires that comprise data bus 1904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1905 for execution. For example, the instructions may initially be carried on a magnetic disk from a remote computer. Alternatively, a remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on the data bus 1904. The bus 1904 carries the data to the volatile storage 1906, from which processor 1905 retrieves and executes the instructions. The instructions received by the volatile memory 1906 may optionally be stored on persistent storage device 1908 either before or after execution by processor 1905. The instructions may also be downloaded into the computer platform 1901 via Internet using a variety of network data communication protocols well known in the art.

The computer platform 1901 also includes a communication interface, such as network interface card 1913 coupled to the data bus 1904. Communication interface 1913 provides a two-way data communication coupling to a network link 1914 that is connected to a local network 1915. For example, communication interface 1913 may be an integrated services digital network (ISDN) card or a modem to provide a data communication connection to a corresponding type of telephone line. As another example, communication interface 1913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1913 sends and receives electrical, electromagnetic or optical signals that carry digital data streams representing various types of information.

Network link 1913 typically provides data communication through one or more networks to other network resources. For example, network link 1914 may provide a connection through local network 1915 to a host computer 1916, or a network storage/server 1917. Additionally or alternatively, the network link 1913 may connect through gateway/firewall 1917 to the wide-area or global network 1918, such as an Internet. Thus, the computer platform 1901 can access network resources located anywhere on the Internet 1918, such as a remote network storage/server 1919. On the other hand, the computer platform 1901 may also be accessed by clients located anywhere on the local area network 1915 and/or the Internet 1918. The network clients 1920 and 1921 may themselves be implemented based on the computer platform similar to the platform 1901.

Local network 1915 and the Internet 1918 both use electrical, electromagnetic or optical signals that carry digital data streams. The signals through the various networks and the signals on network link 1914 and through communication interface 1913, which carry the digital data to and from computer platform 1901, are exemplary forms of carrier waves transporting the information.

Computer platform 1901 can send messages and receive data, including program code, through the variety of network(s) including Internet 1918 and LAN 1915, network link 1914 and communication interface 1913. In the Internet example, when the system 1901 acts as a network server, it might transmit a requested code or data for an application program running on client(s) 1920 and/or 1921 through Internet 1918, gateway/firewall 1917, local area network 1915 and communication interface 1913. Similarly, it may receive code from other network resources.

The received code may be executed by processor 1905 as it is received, and/or stored in persistent or volatile storage devices 1908 and 1906, respectively, or other non-volatile storage for later execution. In this manner, computer system 1901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system. It is intended that the specification and examples be considered as exemplary only, with a true scope and spirit of the invention being indicated by the following claims.

What is claimed is:

1. A computerized data storage system comprising:
   a. a plurality of storage control modules, each comprising a cache;
   b. a plurality of data preservation modules operable to store data associated with at least one host computer, wherein each of the plurality of data preservation modules is associated with one of the plurality of storage control modules;
   c. an interconnect interconnecting the plurality of storage control modules; and
   d. a storage management module operable to receive a request from a client host computer or an administrator and to provide to the client host computer, in response to the received request, a storage volume allocated in one of the plurality of data preservation modules and at least a portion of the cache of one of the plurality of storage control modules, wherein the storage volume and the portion of the cache are provided based on latency information associated with the storage control modules;

wherein the received request comprises volume size requirement information and performance requirement information comprising identification of one of a plurality of rules corresponding to the performance requirement information;

wherein the storage volume and the portion of the cache are provided in accordance with the identified rule;

wherein each of the plurality of rules comprises minimum amount of cache requirement, a storage control module sharing requirement and a data preservation module sharing requirement.

2. The computerized data storage system of claim 1, wherein the storage management module is operable to measure the latency associated with the plurality of storage control modules and the plurality of data preservation modules and to store the measured latency in a latency table.

3. The computerized data storage system of claim 1, further comprising a remote data preservation module connected to the plurality of data preservation modules using a network link associated with an external latency, wherein the storage management module is operable to measure the external latency and wherein the storage volume and the portion of the cache are provided based on latency information and the measured external latency.

4. The computerized data storage system of claim 1, wherein the storage management module is further operable to re-allocate at least one storage volume in the plurality of data preservation modules to free up at least one data preservation module and to cause the freed data preservation module to be powered down.

5. The computerized data storage system of claim 1, wherein the storage management module is further operable to re-allocate at least a portion of the cache of one of the plurality of storage control modules to free up at least one storage control module and to cause the freed storage control module to be powered down.

6. The computerized data storage system of claim 1, wherein the storage management module is further operable to re-allocate at least one storage volume in the plurality of data preservation modules to free up at least one data preservation module and re-allocate at least a portion of the cache of one of the plurality of storage control modules to free up at least one storage control module and to cause the freed data preservation module and storage control module to be powered down.

7. A method executed by a computerized data storage system comprising a plurality of storage control modules, each comprising a cache, and a plurality of data preservation modules operable to store data' associated with at least one host computer, wherein each of the plurality of data preservation modules is associated with one of the plurality of storage control modules; the method comprising:
   a. receiving a request from a client host computer or an administrator; and
   b. providing to the client host computer, in response to the received request, a storage volume allocated in one of the plurality of data preservation modules and at least a portion of the cache of one of the plurality of storage control modules, wherein the storage volume and the portion of the cache are provided based on latency information associated with the storage control modules;

wherein the received request comprises volume size requirement information and performance requirement information comprising identification of one of a plurality of rules corresponding to the performance requirement information and wherein the storage volume and the portion of the cache are provided in accordance with the identified rule;

wherein each of the plurality of rules comprises minimum amount of cache requirement, a storage control module sharing requirement and a data preservation module sharing requirement.

8. The method of claim 7, further comprising measuring the latency associated with the plurality of storage control modules and the plurality of data preservation modules and storing the measured latency in a latency table.

9. The method of claim 7, further comprising measuring external latency associated with a remote data preservation module connected to the plurality of data preservation modules using a network link, wherein the storage volume and the portion of the cache are provided based on latency information and the measured external latency.

10. The method of claim 7, further comprising:
re-allocating at least one storage volume in the plurality of data preservation modules to free up at least one data preservation module; and
causing the freed data preservation module to be powered down.

11. The method of claim 7, further comprising:
re-allocating at least a portion of the cache of one of the plurality of storage control modules to free up at least one storage control module; and
causing the freed storage control module to be powered down.

12. The method of claim 7, further comprising:
re-allocating at least one storage volume in the plurality of data preservation modules to free up at least one data preservation module;
re-allocating at least a portion of the cache of one of the plurality of storage control modules to free up at least one storage control module; and
causing the freed data preservation module and storage control module to be powered down.

13. A non-transitory computer readable storage medium embodying a computer code implementing a method executed by a computerized data storage system comprising a plurality of storage control modules, each comprising a cache, and a plurality of data preservation modules operable to store data associated with at least one host computer, wherein each of the plurality of data preservation modules is associated with one of the plurality of storage control modules; the method comprising:
a. receiving a request from a client host computer or an administrator; and
b. providing to the client host computer, in response to the received request, a storage volume allocated in one of the plurality of data preservation modules and at least a portion of the cache of one of the plurality of storage control modules, wherein the storage volume and the portion of the cache are provided based on latency information associated with the storage control modules;

wherein the received request comprises volume size requirement information and performance requirement information comprising identification of one of a plurality of rules corresponding to the performance requirement information and wherein the storage volume and the portion of the cache are provided in accordance with the identified rule;

wherein each of the plurality of rules comprises minimum amount of cache requirement, a storage control module sharing requirement and a data preservation module sharing requirement.

14. The non-transitory computer readable storage medium of claim 13, wherein the method further comprises measuring the latency associated with the plurality of storage control modules and the plurality of data preservation modules and storing the measured latency in a latency table.

15. The non-transitory computer readable storage medium of claim 13, wherein the method further comprises:
re-allocating at least one storage volume in the plurality of data preservation modules to free up at least one data preservation module; and
causing the freed data preservation module to be powered down.

16. The non-transitory computer readable storage medium of claim 13, wherein the method further comprises:
re-allocating at least a portion of the cache of one of the plurality of storage control modules to free up at least one storage control module; and
causing the freed storage control module to be powered down.

17. The non-transitory computer readable storage medium of claim 13, wherein the method further comprises:
re-allocating at least one storage volume in the plurality of data preservation modules to free up at least one data preservation module;
re-allocating at least a portion of the cache of one of the plurality of storage control modules to free up at least one storage control module; and
causing the freed data preservation module and storage control module to be powered down.

18. The non-transitory computer readable storage medium of claim 13, wherein the method further comprises measuring external latency associated with a remote data preservation module connected to the plurality of data preservation modules using a network link, wherein the storage volume and the portion of the cache are provided based on latency information and the measured external latency associated with the storage control modules.

* * * * *